US012011729B2

(12) United States Patent
Sulzer et al.

(10) Patent No.: US 12,011,729 B2
(45) Date of Patent: Jun. 18, 2024

(54) HANDHELD FLUID SPRAYER

(71) Applicant: Wagner Spray Tech Corporation, Plymouth, MN (US)

(72) Inventors: Christopher J. Sulzer, St. Louis Park, MN (US); Joseph W. Kieffer, Chanhassen, MN (US)

(73) Assignee: Wagner Spray Tech Corporation, Plymouth, MN (US)

( * ) Notice: Subject to any disclaimer, the term of this patent is extended or adjusted under 35 U.S.C. 154(b) by 0 days.

(21) Appl. No.: 18/168,109

(22) Filed: Feb. 13, 2023

(65) Prior Publication Data

US 2023/0191435 A1 Jun. 22, 2023

Related U.S. Application Data

(62) Division of application No. 16/356,658, filed on Mar. 18, 2019, now Pat. No. 11,826,766.

(Continued)

(51) Int. Cl.
*B05B 11/10* (2023.01)

(52) U.S. Cl.
CPC ...... *B05B 11/1001* (2023.01); *B05B 11/1057* (2023.01); *B05B 11/1061* (2023.01)

(58) Field of Classification Search
CPC ............. B05B 11/1001; B05B 11/1061; B05B 11/1057; B05B 7/2464

(Continued)

(56) References Cited

U.S. PATENT DOCUMENTS 604,151 A 5/1898 Horn
1,158,574 A 11/1915 Smith (Continued)

FOREIGN PATENT DOCUMENTS

CA 2437646 A1 2/2004
CN 2283521 Y 6/1998

(Continued)

OTHER PUBLICATIONS

International Search Report and Written Opinion for International Patent Application No. PCT/US2019/022713, date of mailing: Jul. 31, 2019, date of filing: Mar. 18, 2019, 22 pages.

(Continued)

*Primary Examiner* — Christopher R Dandridge
*Assistant Examiner* — Kevin Edward Schwartz
(74) *Attorney, Agent, or Firm* — Christopher J. Volkmann; Kelly, Holt & Christenson, PLLC.

(57) ABSTRACT

An example portable fluid spraying system includes a handheld fluid sprayer. The handheld fluid sprayer includes a fluid reservoir configured to store a fluid, a pump configured to pump the fluid from the fluid reservoir to an outlet of the handheld fluid sprayer and a handle. The handheld fluid sprayer includes a first trigger proximate the handle, configured to control fluid flow to the outlet. The portable fluid spraying system includes a fluid hose having a coupling mechanism configured to removably couple to the handheld fluid sprayer proximate the outlet and a fluid spray gun. The fluid spray gun includes a gun inlet configured to couple to the fluid hose and receive the fluid from the handheld fluid sprayer, a gun outlet configured to expel the fluid in a spray pattern and a second trigger configured to control fluid flow to the gun outlet.

13 Claims, 33 Drawing Sheets

Related U.S. Application Data

(60) Provisional application No. 62/744,803, filed on Oct. 12, 2018, provisional application No. 62/644,906, filed on Mar. 19, 2018.

(58) Field of Classification Search
USPC .......................................................... 239/154
See application file for complete search history.

(56) References Cited

U.S. PATENT DOCUMENTS

| | | | | | |
|---|---|---|---|---|---|
| 2,961,335 | A | | 11/1960 | Shepard | |
| 3,249,262 | A | | 5/1966 | Barr et al. | |
| 3,317,141 | A | | 5/1967 | Mann | |
| 3,403,818 | A | | 10/1968 | Eugen | |
| 3,446,245 | A | * | 5/1969 | Snyder, Jr. | F16L 15/008 285/276 |
| 3,893,627 | A | | 7/1975 | Siczek et al. | |
| 4,093,123 | A | | 6/1978 | Maran | |
| 4,210,796 | A | * | 7/1980 | Moerke | B23K 9/323 219/137.9 |
| 4,406,406 | A | | 9/1983 | Knapp | |
| 4,678,010 | A | | 7/1987 | Purvis et al. | |
| 4,787,560 | A | | 11/1988 | DeYoreo | |
| 4,811,904 | A | | 3/1989 | Ihmels et al. | |
| 4,879,137 | A | | 11/1989 | Behr et al. | |
| 5,769,321 | A | | 6/1998 | Cyphers | |
| 6,270,327 | B1 | | 8/2001 | Wolz et al. | |
| 6,742,722 | B2 | | 6/2004 | Hosoda et al. | |
| 6,769,632 | B2 | | 8/2004 | Takeuchi | |
| 6,989,000 | B2 | | 1/2006 | Schreijag et al. | |
| 7,178,743 | B2 | | 2/2007 | Clarke, III et al. | |
| 7,182,538 | B2 | | 2/2007 | Grosso et al. | |
| 7,338,225 | B1 | | 3/2008 | Taylor | |
| 7,448,557 | B2 | | 11/2008 | Ray et al. | |
| 7,556,447 | B2 | | 7/2009 | Bruggeman et al. | |
| 8,408,157 | B2 | | 4/2013 | Ling | |
| 8,501,282 | B2 | | 8/2013 | Staunton et al. | |
| 8,807,455 | B2 | | 8/2014 | Havlovitz et al. | |
| 9,149,821 | B2 | | 10/2015 | Micheli et al. | |
| 9,180,472 | B2 | | 11/2015 | Munn et al. | |
| 9,497,953 | B2 | | 11/2016 | Mitchell et al. | |
| 9,517,479 | B2 | | 12/2016 | Hines et al. | |
| 9,604,234 | B2 | | 3/2017 | Thompson et al. | |
| 9,604,235 | B2 | | 3/2017 | Thompson et al. | |
| 9,914,141 | B2 | | 3/2018 | Thompson et al. | |
| 2003/0080211 | A1 | | 5/2003 | Takeuchi | |
| 2004/0084553 | A1 | | 5/2004 | Joseph et al. | |
| 2006/0261185 | A1 | | 11/2006 | Joseph et al. | |
| 2007/0179452 | A1 | | 8/2007 | Kosinski | |
| 2009/0026290 | A1 | | 1/2009 | Fox | |
| 2010/0224699 | A1 | * | 9/2010 | Gaddis | B05B 7/2491 239/311 |
| 2011/0198414 | A1 | | 8/2011 | Munn et al. | |
| 2011/0224642 | A1 | | 9/2011 | Fojtik | |
| 2012/0006431 | A1 | * | 1/2012 | Gilpatrick | B05B 1/1654 137/565.01 |
| 2012/0037726 | A1 | * | 2/2012 | Johnson | B05B 9/01 239/333 |
| 2013/0075495 | A1 | | 3/2013 | Vellutato, Jr. et al. | |
| 2013/0206856 | A1 | | 8/2013 | Thompson et al. | |
| 2013/0206867 | A1 | | 8/2013 | Hines et al. | |
| 2013/0251437 | A1 | | 9/2013 | Ling et al. | |
| 2014/0203098 | A1 | | 7/2014 | Bierie | |
| 2015/0217312 | A1 | | 8/2015 | Hines et al. | |
| 2015/0258558 | A1 | * | 9/2015 | Schrum | B05B 7/2491 239/10 |
| 2016/0161059 | A1 | | 6/2016 | Kristola et al. | |
| 2016/0175862 | A1 | | 6/2016 | Chen | |
| 2017/0028133 | A1 | | 2/2017 | Martz | |
| 2017/0165692 | A1 | * | 6/2017 | Thompson | F04B 9/045 |
| 2017/0209880 | A1 | * | 7/2017 | Carideo | F04B 35/04 |
| 2017/0252761 | A1 | | 9/2017 | Meuler et al. | |
| 2017/0265526 | A1 | | 9/2017 | Li et al. | |
| 2018/0221898 | A1 | | 8/2018 | Schoeps et al. | |
| 2019/0283059 | A1 | | 9/2019 | Sulzer et al. | |
| 2020/0230632 | A1 | | 7/2020 | Kieffer et al. | |
| 2020/0261933 | A1 | | 8/2020 | Smith | |

FOREIGN PATENT DOCUMENTS

| | | | |
|---|---|---|---|
| CN | 1644245 | A | 7/2005 |
| CN | 202951592 | | 5/2013 |
| CN | 104888992 | A | 9/2015 |
| CN | 205628374 | U | 10/2016 |
| CN | 106714981 | A | 5/2017 |
| CN | 106999966 | A | 8/2017 |
| KR | 100686556 | | 2/2007 |
| KR | 10-1483424 | B1 | 1/2015 |

OTHER PUBLICATIONS

International Preliminary Report on Patentability for International Patent Application No. PCT/US2019/022713, mailing date of: Oct. 1, 2020, filing date of: Mar. 18, 2019, 13 pages.
First Office Action for Chinese Patent Application No. 201980020235.8 dated Jun. 21, 2021, 24 pages with English Translation.
Second Office Action for Chinese Patent Application No. 201980020235.8 dated Dec. 15, 2021, 16 pages with English Translation.
Extended Search Report for European Patent Application No. 19770687.2, dated Sep. 16, 2021, 8 pages.
Rejection Decision for Chinese Patent Application No. 201980020235.8 dated Apr. 12, 2022, 13 pages with English Translation.
Prosecution History for U.S. Appl. No. 16/356,658, including: Final Office Action dated Nov. 22, 2022, Amendment dated Oct. 6, 2022, Non-Final Office Action dated Jul. 6, 2022, Amendment with RCE dated Jun. 9, 2022, Final Office Action dated Mar. 9, 2022, Amendment dated Dec. 16, 2021, Non-Final Office Action dated Sep. 20, 2021, Amendment with RCE dated Sep. 2, 2021, Final Office Action dated Jun. 8, 2021, Amendment dated Mar. 8, 2021, Non-Final Office Action dated Dec. 8, 2020, Part 1 of 2.
Prosecution History for U.S. Appl. No. 16/356,658, including: Response to Restriction Requirement dated Nov. 23, 2020, and Requirement for Restriction dated Sep. 22, 2020, 234 pages.

* cited by examiner

HANDHELD FLUID SPRAYER

CROSS-REFERENCE TO RELATED APPLICATIONS

The present application is a divisional of and claims priority of U.S. patent application Ser. No. 16/356,658, filed Mar. 18, 2019, which is based on and claims the benefit of U.S. Provisional Patent Application Ser. No. 62/644,906, filed Mar. 19, 2018, and U.S. Provisional Patent Application Ser. No. 62/744,803, filed Oct. 12, 2018 the contents of which are hereby incorporated by reference in their entirety.

BACKGROUND

Fluid sprayers are typically used in a variety of applications to break up, or atomize, a liquid material for delivery in a desired spray pattern. Some exemplary applications include, but are not limited to, applying a coating material, such as paint, to a substrate.

SUMMARY

An example portable fluid spraying system includes a handheld fluid sprayer. The handheld fluid sprayer includes a fluid reservoir configured to store a fluid, a pump configured to pump the fluid from the fluid reservoir to an outlet of the handheld fluid sprayer and a handle. The handheld fluid sprayer includes a first trigger proximate the handle, configured to control fluid flow to the outlet. The portable fluid spraying system includes a fluid hose having a coupling mechanism configured to removably couple to the handheld fluid sprayer proximate the outlet and a fluid spray gun. The fluid spray gun includes a gun inlet configured to couple to the fluid hose and receive the fluid from the handheld fluid sprayer, a gun outlet configured to expel the fluid in a spray pattern and a second trigger configured to control fluid flow to the gun outlet.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

DETAILED DESCRIPTION OF THE DRAWINGS

Some fluid spraying applications can restrict the use of large fluid sprayer systems. For example, the application may require that a user operate on a scaffolding, ladder or scissor lift with limited space. Accordingly, smaller portable fluid sprayers are ideal for these scenarios. Currently, portable fluid sprayers are available with some limitations. For example, portable fluid sprayers typically have small fluid containers, such as one-quart cups, which require frequent and sometimes difficult or burdensome refilling processes.

Figure 1:
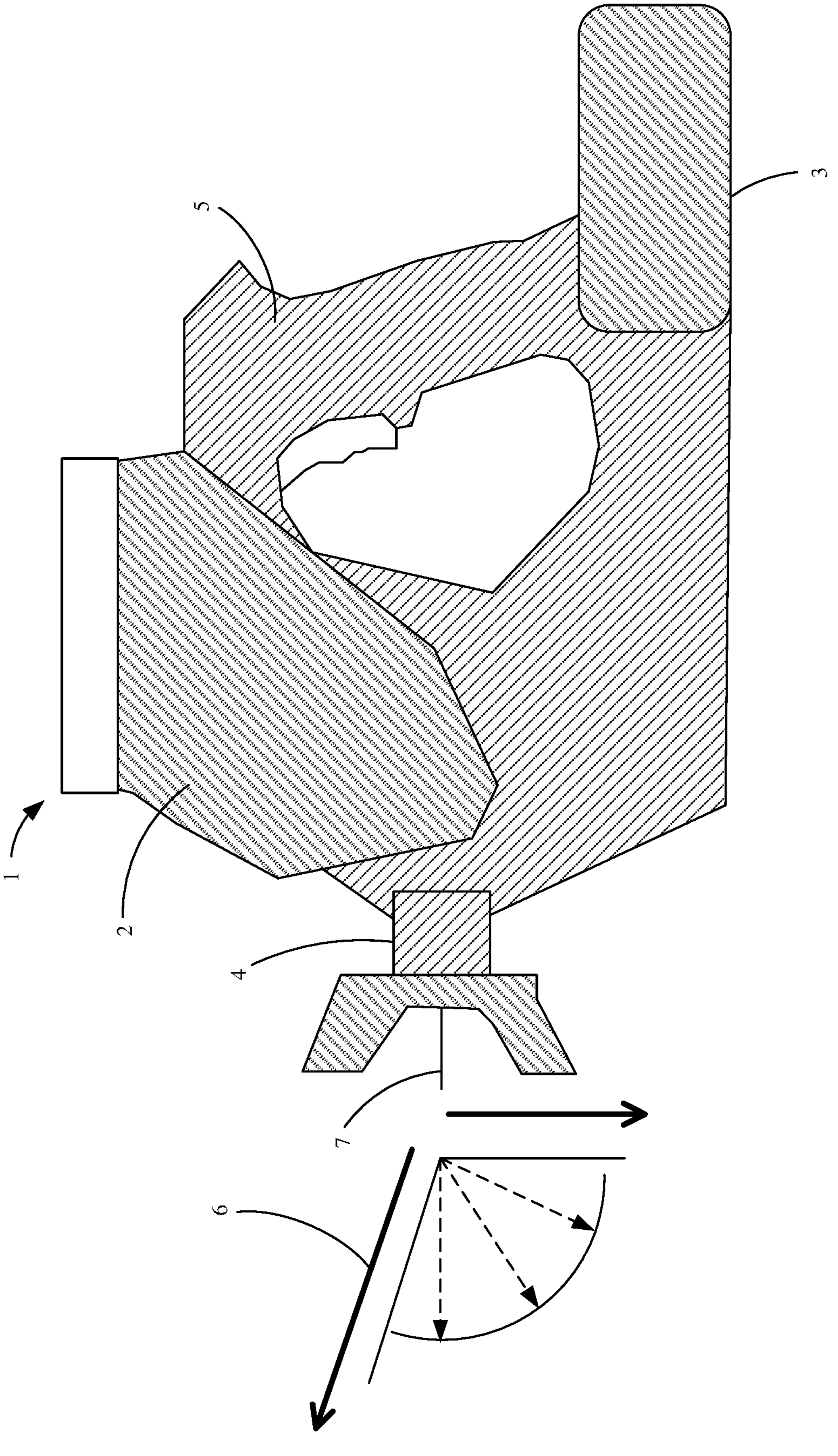
FIG. 1 is a diagrammatic view of one example of a gravity feed fluid sprayer.

FIG. 1 is a diagrammatic view of one example of a gravity feed paint sprayer 1. Fluid sprayer 1 includes a cup 2 that stores the fluid (e.g., paint) to be sprayed. Fluid sprayer 1 also includes a battery 3 that supplies energy for a motor that pumps the fluid through outlet 4 for application to a surface. One limitation of gravity feed sprayer 1 is the effective spraying angle represented at reference numeral 6. The "spray angle" refers to the range through which the user can orient the axis 7 of outlet 4 to effectively spray the fluid. Spray angle 6 is limited due to the fluid relying on gravity for feeding. Another limitation of the sprayer shown in FIG. 1 is that cup 2 is forward of handle 5, and therefore the user's hand. As such, when cup 2 is full this position can make the sprayer feel heavy and unbalanced.

Figure 2:
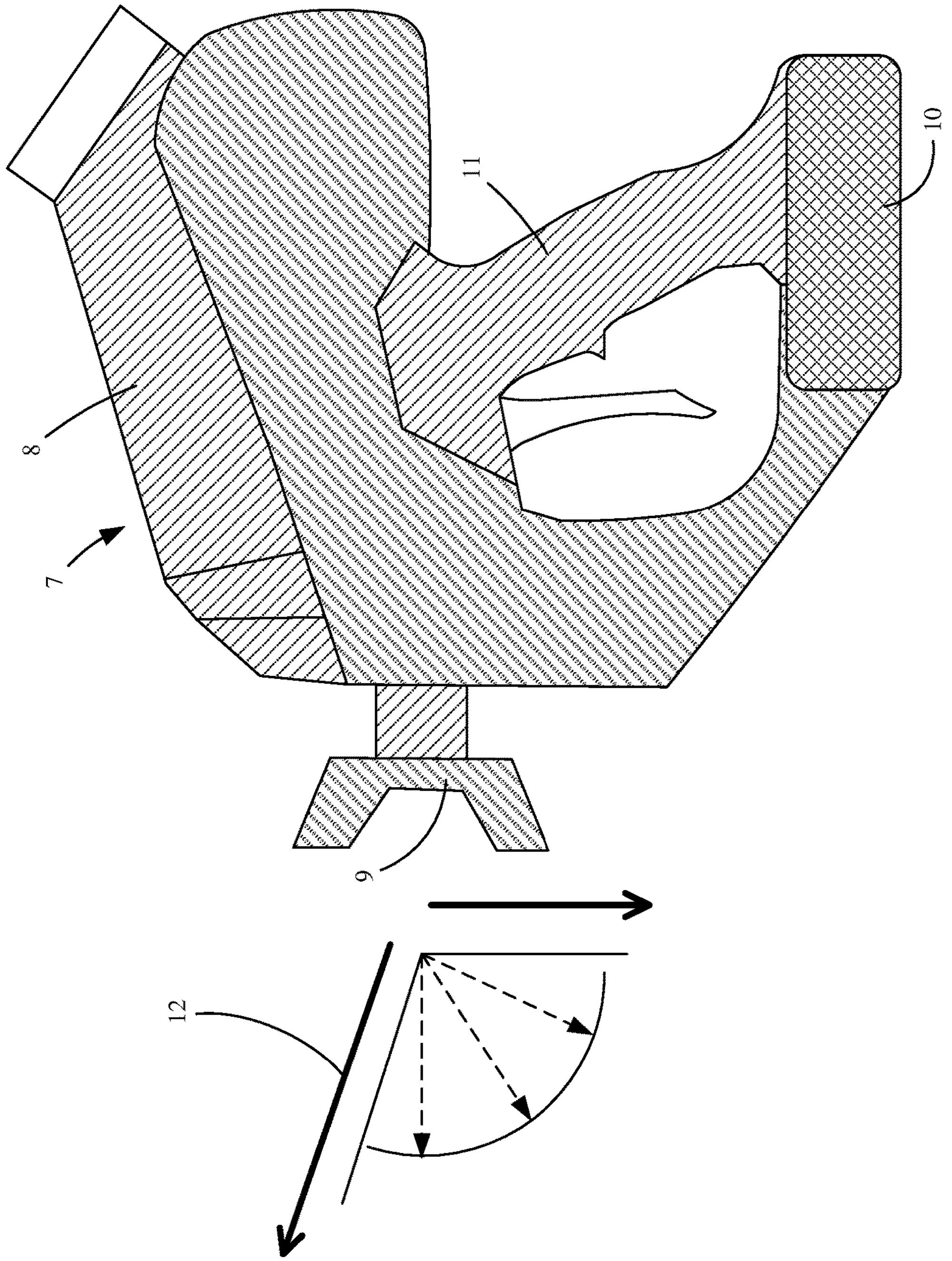
FIG. 2 is a diagrammatic view of one example of a gravity feed fluid sprayer.

FIG. 2 is a diagrammatic view of another example gravity feed paint sprayer 7. Sprayer 7 of FIG. 2 is similar to that of gravity feed paint sprayer 1 in FIG. 1, namely that sprayer 7 is also limited in spray angle 12 due to the gravity feed. However, cup 8 of sprayer 7 is located above, and partially behind handle 11 including battery 10, which can provide improved balance for the user.

Figure 3:
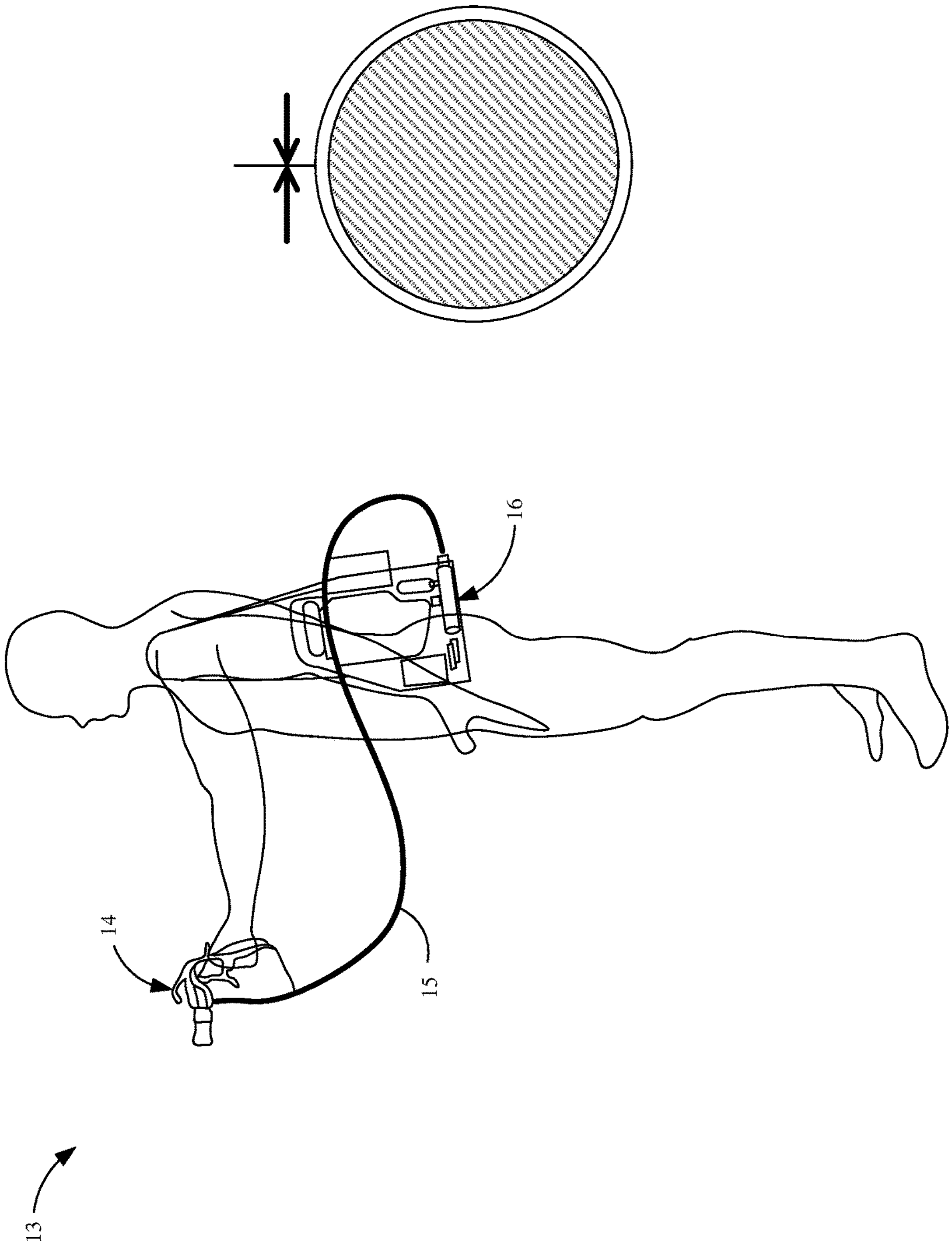
FIG. 3 is a diagrammatic view of one example of a portable hopper fluid sprayer.

FIG. 3 is a diagrammatic view of an example portable fluid sprayer system 13 that uses a hopper 16. This portable fluid sprayer system 13 includes an applicator 14, a whip or hose 15, and hopper 16. This design uses a pump in hopper 16 to fix the spray angle problem associated with gravity feed sprayers. In the present example, hopper 16 is carried as a shoulder pack by the user, however hopper 16 could be carried as a back pack or otherwise by the user. Because hopper 16 and its corresponding components (battery, pump, fluid reservoir, etc.) are located remotely from applicator 14 and the user's hand, there is less hand fatigue associated with holding applicator 14. Also, having hopper 16 back or shoulder mounted allows the user to hold a larger amount of fluid, larger pump and/or a larger battery, etc.

Figure 4:
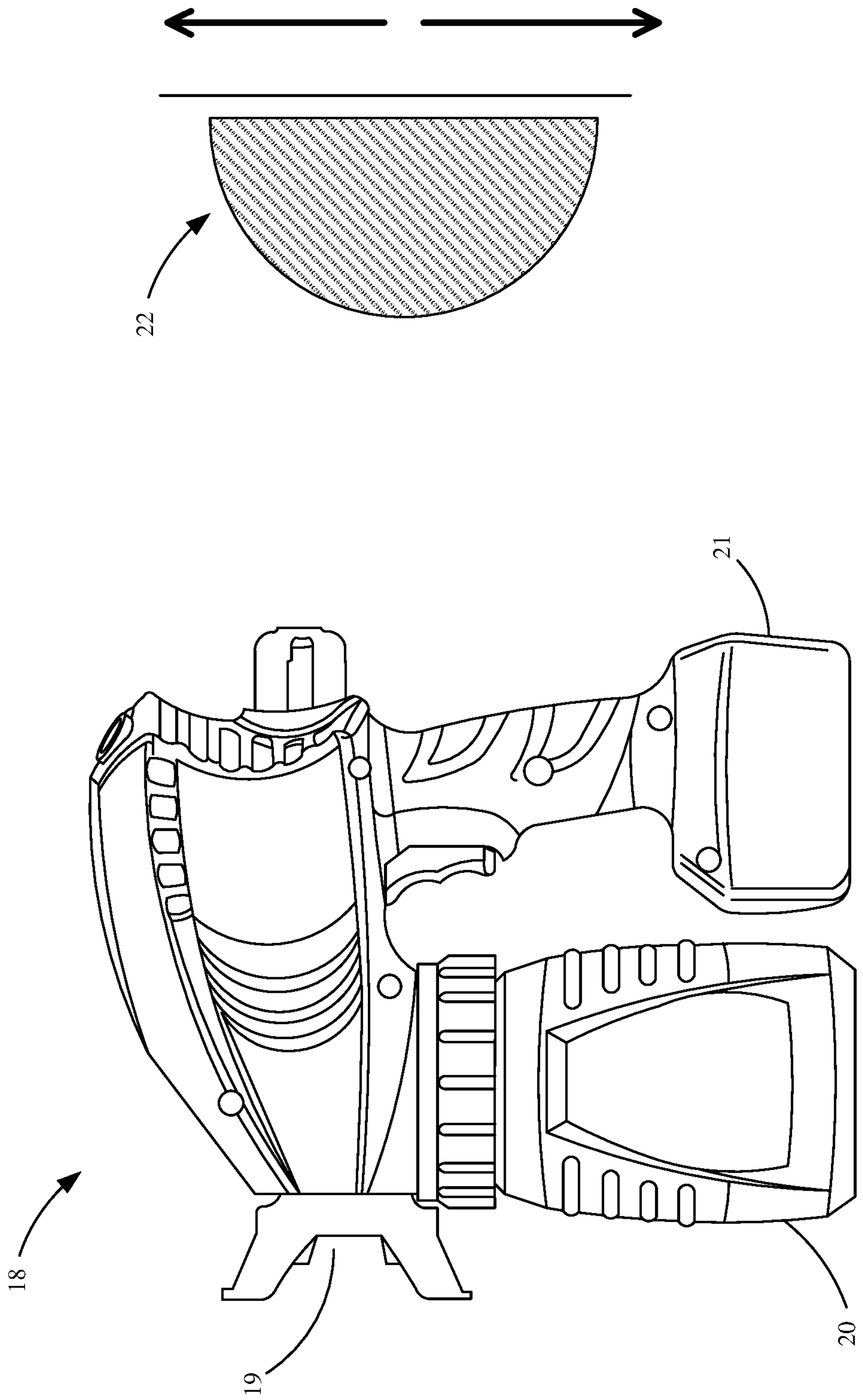
FIG. 4 is diagrammatic view of one example of a suction feed fluid sprayer.

FIG. 4 is a diagrammatic view of an example suction feed fluid sprayer 18. Sprayer 18 of FIG. 4 includes an outlet 19, a cup 20, and a battery 21. Sprayer 18 is suction feed and therefore has a robust spray angle 22 solving the problem associated with some gravity feed sprayers due to a flexible pickup tube employed by sprayer 18. However, sprayer 18 has cup 20 in front of the user's hand that, when full, can make the gun unbalanced and lead to fatigue of a user's hand. Also, cup 20 needs to be unscrewed and removed from the gun to be filled, which leaves the suction tube exposed and often dripping fluid. Filling cup 20 involves pouring fluid into cup 20 which may also be messy and cumbersome to the user.

Figure 5:
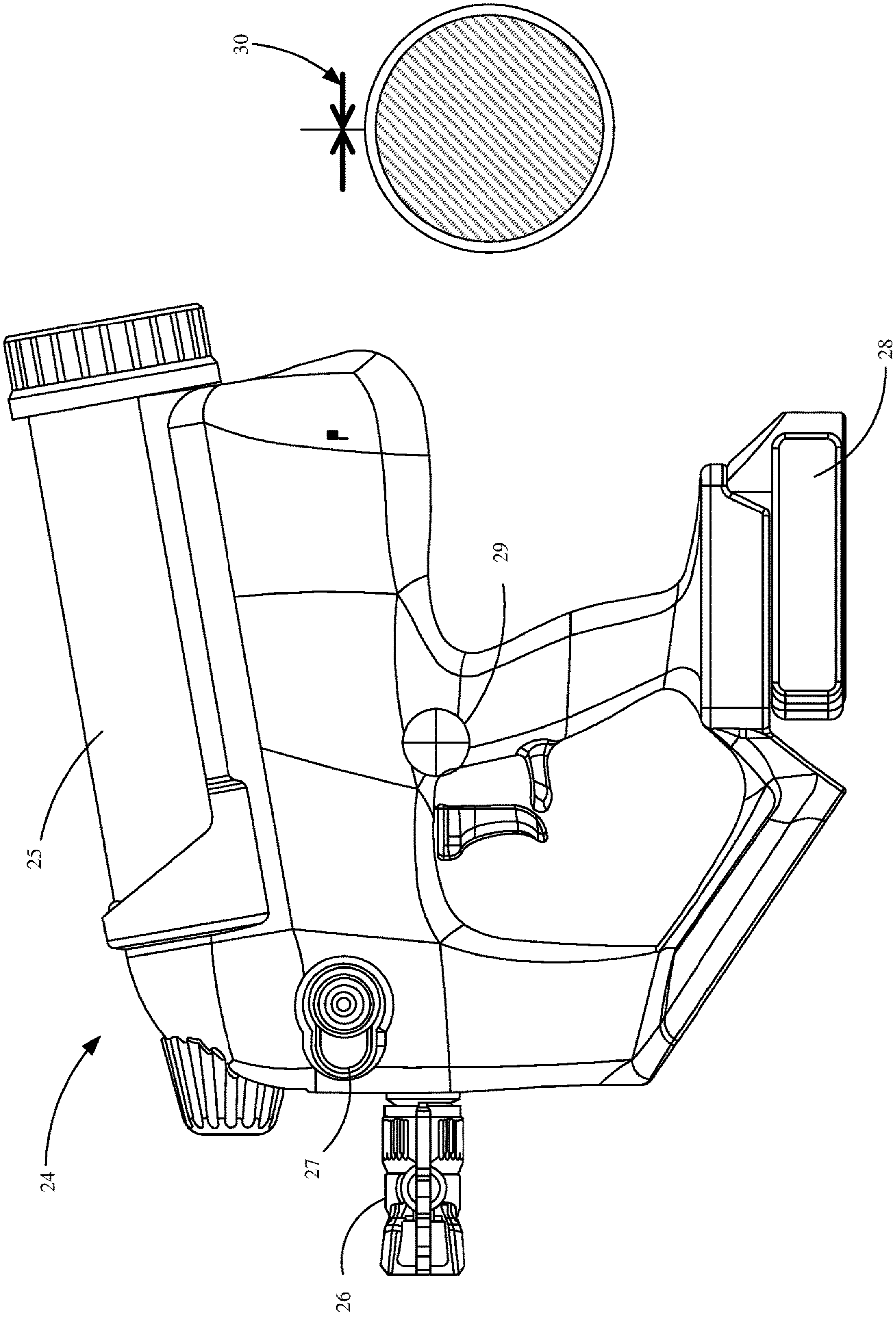
FIG. 5 is a diagrammatic view of one example of a cartridge feed fluid sprayer.

FIG. 5 is a diagrammatic view of an example cartridge feed fluid sprayer 24. Sprayer 24 includes an outlet 26, a cartridge 25 and a battery 28. Cartridge 25 is located and shaped to balance sprayer 24 in a user's hand. Sprayer 24 uses suction, gravity, or a combination thereof, to extract the fluid from cartridge 25 and improves the spray angle compared to gravity feed sprayers. Alternatively, or in addition, the fluid in cartridge 25 is pressurized, for example, by a plunger in cartridge 25 that is urged forward by a spring or otherwise, to improve the spray angle. Sprayer 24 also includes a pump primer button 27 used to prime the pump by depressing the pump primer button 27 which urges fluid from the cartridge towards the pump. In another example, the pump of sprayer 24 is primed by gravity. As shown, sprayer 24 has a spray angle 30 in any direction, this is because the plunger in cartridge 25 urges fluid towards the pump and outlet regardless of orientation of sprayer 24. Sprayer 24 is an airless sprayer, that is a sprayer that expels the fluid into an atomized spray pattern without air assisting in the atomization (e.g., the fluid is pump at pressure through outlet 26 and little to no air is pumped through either outlet 26 or a separate air outlet proximate outlet 26).

Additionally, because of the location of various components of sprayer 24, the approximate center of gravity 29 is located on or near the handle which balances the sprayer 24 in a user's hand. For instance, an interior motor, a portion of cartridge 25, battery 28, etc. are located rearward of the handle and they are balanced by another portion of cartridge 25, an interior fluid pump, an interior accumulator, the outlet 26, etc. that are located forward of the handle.

Figure 6:
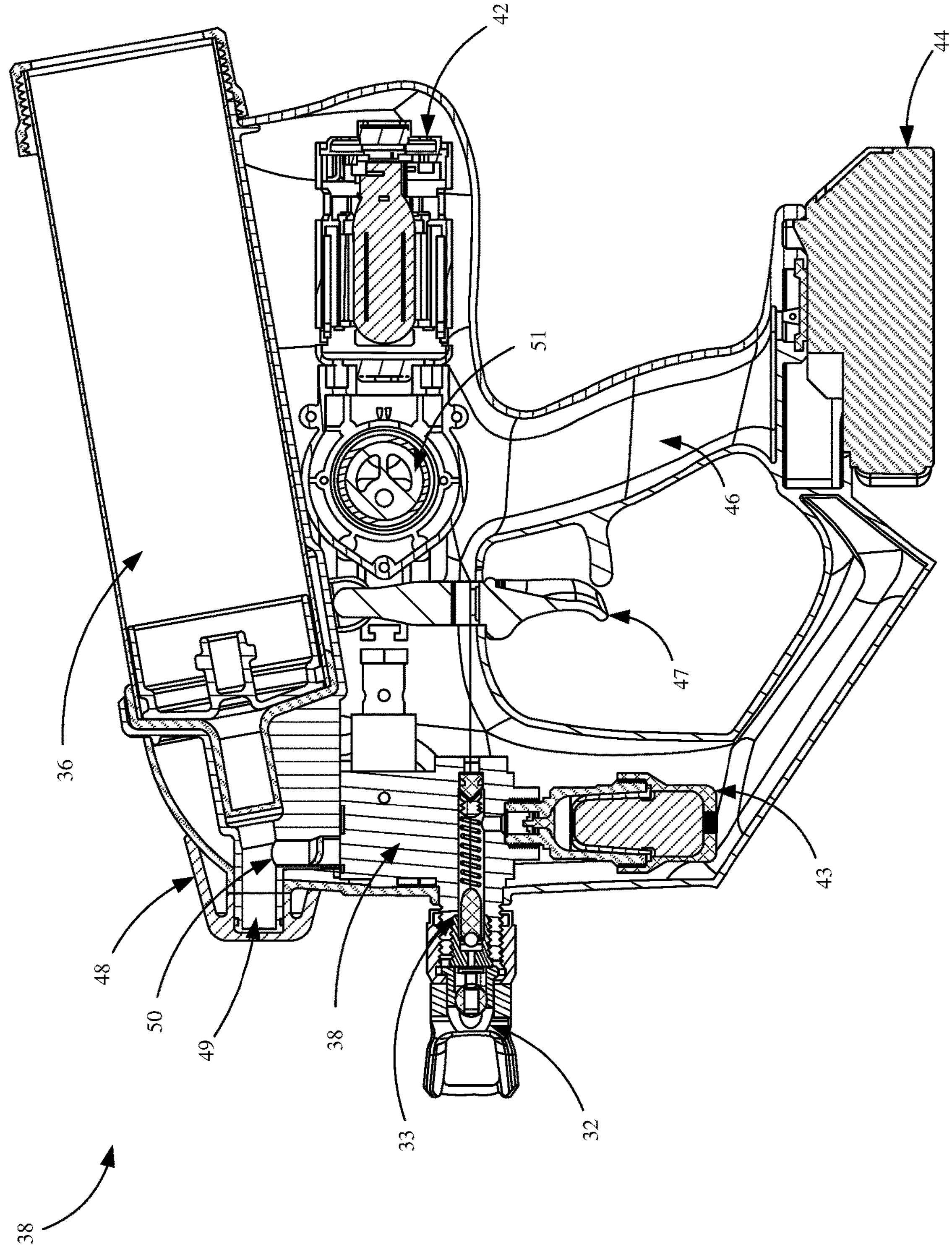
FIG. 6 is a sectional view of the example cartridge feed fluid sprayer shown in FIG. 5.

FIG. 6 is a sectional view of an example cartridge feed fluid sprayer 31. Cartridge feed fluid sprayer 31 is a handheld portable sprayer. For example, the components of sprayer 31 are contained within a portable housing or coupled to the housing, such that a user holding the housing supports the entire sprayer 31. As shown, sprayer 31 includes media reservoir 36, motor 42, a reciprocating mechanism 51, a battery 44, an accumulator 34, an outlet 32, a valve 33 and a pump 38. Battery 44 powers motor 42 which drives pump 38 through a reciprocating mechanism (not shown). Pump 38 delivers liquid from media reservoir 36, which in this instance is a cartridge, to valve 33, which is operated (opened/closed) by trigger 47. When valve 33 is open, the fluid flows to outlet 32 and is expelled as a spray pattern. When pump 38 is in a retreating state accumulator 34 operates to maintains a relatively constant pressure at valve 33 and outlet 32, thereby reducing the above-mentioned issue of pulsating pressure.

Sprayer 31 also includes a refill cap 48, refill port 49 and refill cavity 50. Refill cap 48 can be removed to expose refill port 49 that is fluidically coupled to cartridge 36 through a refill cavity 50. Refill port 49 and refill cavity 50 allow for refilling of cartridge 36, without removing cartridge 36 from sprayer 31. FIGS. 12 and 13 illustrate examples of refilling a cartridge that could also be used here without removing cartridge 36 from sprayer 31. For example, a pickup assembly may be inserted into refill port 49 after refill cap 48 is removed. The pickup assembly effectively extends refill cavity 50 through a pickup tube that can be inserted into a fluid source. Then the plunger within cartridge 36 can be urged rearward, such that a vacuum is created and the fluid from the fluid source is drawn into cartridge 36 through the pickup assembly.

Figure 7:
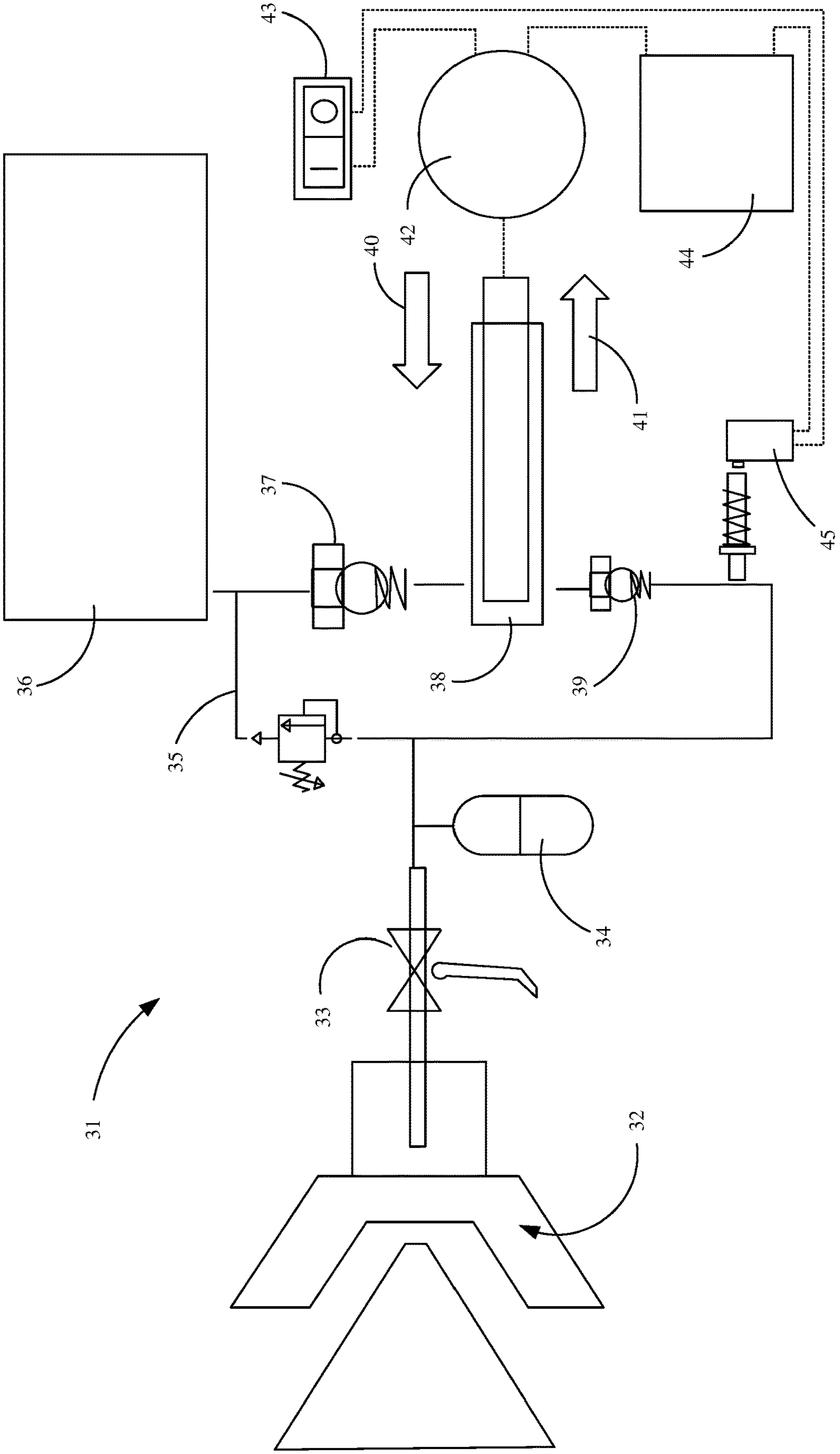
FIG. 7 is a schematic block diagram of the example fluid sprayer shown in FIG. 5.

FIG. 7 is a schematic block diagram of the example fluid sprayer 31 shown in FIG. 6. Fluid sprayer 31 includes a valve 33, an accumulator 34, a pressure relief 35, an inlet valve 37, an outlet valve 39, a pressure control 45, a pump 38, a fluid/media reservoir 36, a battery 44, a motor 42 and an on-off switch 43. On-off switch 43 controls operation of motor 42, such as whether or not motor 42 receives power from battery 44. When motor 42 receives power, it drives pump 38 which pumps fluid from media reservoir 36 to gun valve 33. Gun valve 33 is controlled by the user through a trigger 47. When valve 33 is in an open position fluid is expelled through outlet 32.

In the illustrated example, pump 38 is a single piston pump having a piston that reciprocates in a pump chamber. A piston pump operates by alternating a piston between a driving state (represented by arrow 40) and retreating state (represented by arrow 41). While in the driving state the piston of pump 38 is pushing fluid along a path towards gun valve 33. While in the driving state, inlet valve 37 prevents fluid from being pumped back into media reservoir 36 and outlet valve 39 allows fluid flow towards gun valve 33. While the piston is in the retreating state, outlet valve 39 prevents the piston of pump 38 from pulling the fluid backwards in the fluid path and inlet valve 37 allows fluid to be pulled from media reservoir 36 into pump 38. One problem often associated with this configuration is a pulsing pressure, which results in high (and low) pressure spikes as the pump alternates between the driving state and retreating state. To mitigate these pressure spikes, accumulator 34 is used to supply pressure while the pump is in the retreating state.

Figure 8:
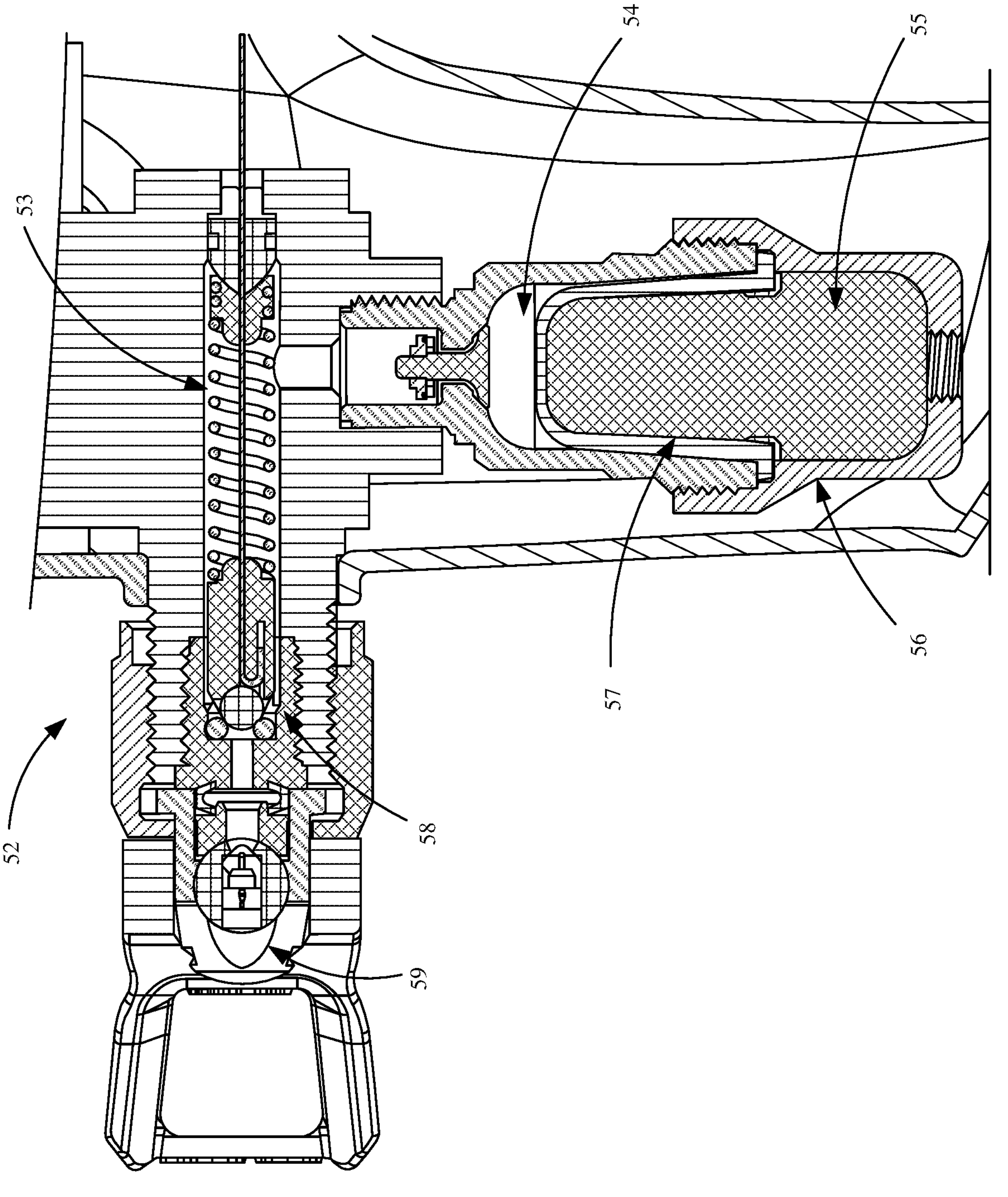
FIG. 8 is a sectional view of one example of an accumulator and fluid chamber assembly for a fluid sprayer.

FIG. 8 is a sectional view of a portion of sprayer 31. When the piston of pump 38 is actively pushing fluid, fluid is pumped into fluid path 53 and also into fluid chamber 54 associated with accumulator 56. As fluid is pumped into fluid chamber 54, potential energy is stored. When the piston is in a retreating state, the potential energy is released which forces the fluid in fluid chamber 54 back into fluid path 53 towards outlet 59, thereby mitigating a pressure drop in fluid path 53.

In the illustrated example, accumulator 56 includes a fluid chamber 54, a pliable wall 57 and a pressurized chamber 55 filled with a compressible gas such as nitrogen. As fluid is pumped into fluid chamber 54, pressurized chamber 55 is compressed via displacement of pliable wall 57. This displacement of the pliable wall 57 and compression of pressurized chamber 55 stores potential energy that is released when the piston is in a retreating state.

In another example, accumulator 56 includes fluid chamber 54 coupled to pliable wall 57. Fluid entering fluid chamber 54 causes an expansion of pliable wall 57. This expansion of pliable wall 57 stores the potential energy that is released when the piston is in a retreating state. (e.g. the wall expands during potential energy storing and returns to its unexpanded state during energy release).

In another example, the potential energy is stored by a spring, magnet or other biasing force. In another example, a piston accumulator includes a fluid chamber, a movable piston, and a pressurized gas chamber. In this example, the piston separates the fluid chamber and the gas chamber in place of pliable wall 57.

Figure 9:
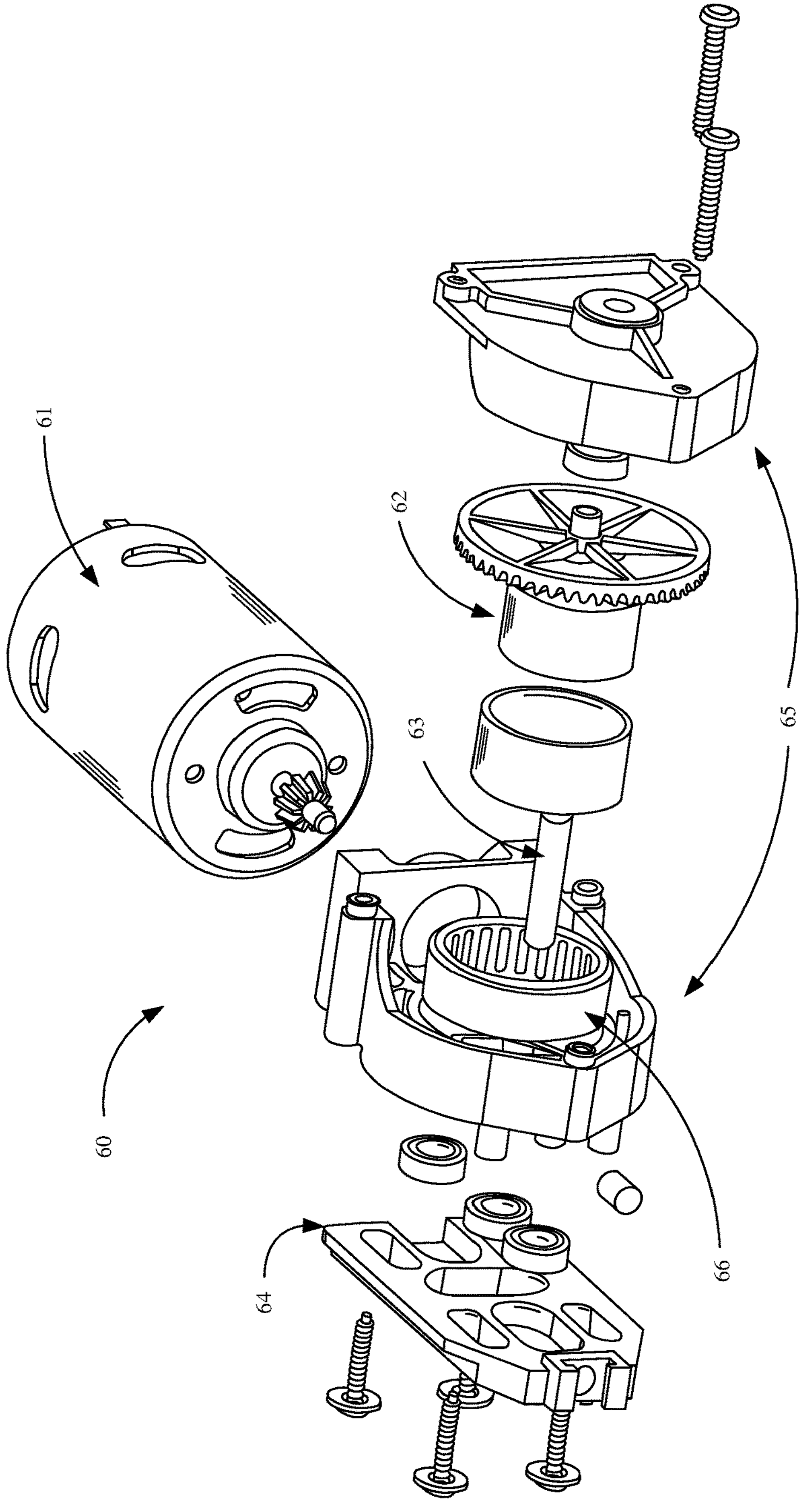
FIG. 9 is an exploded view of one example of a motor system for a portable fluid sprayer.

FIG. 9 is an exploded view of one example of a motor assembly 60 for a portable fluid sprayer. Motor assembly 60 includes a motor 61, a gear 62, a housing 65, the needle bearing 66, a pin 63 and a yoke 64. Motor 61 is attached to housing 65 which retains gear 62 and ensures motor 61 stays in operable contact with gear 62. Gear 62 is rotatably coupled to needle bearing 66 to reduce friction. Gear 62 also retains pin 63 at a non-center location. As gear 62 rotates pin 63 rotates about the center at a given radius. Pin 63 contacts a slot in yoke 64 which drives yoke 64 linearly back and forth. Yoke 64 is operably coupled to a pump (not shown) to pump fluid to an outlet and/or pump a fluid to a fluid reservoir.

Figure 10A:
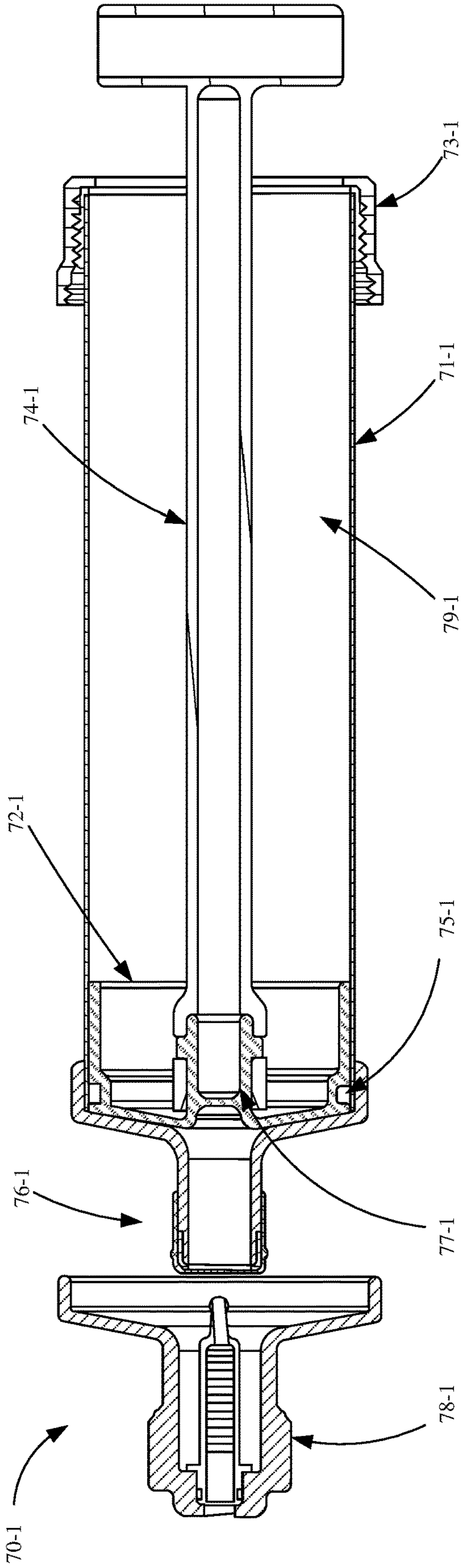
FIG. 10A is a sectional view of one example of a cartridge for a fluid sprayer.

FIG. 10A is a sectional view of cartridge 70-1 for a fluid sprayer, such as the sprayer shown in FIGS. 5-7. Cartridge 70-1 includes a housing 71-1, a plunger 72-1, an end cap 73-1, a handle 74-1, a seal 75-1 and a valve 76-1. Housing 71-1 has a hollow inner portion 79-1 that contains the fluid to be applicated. Plunger 72-1 is retained within the hollow inner portion 79-1 to draw fluid in or expel fluid out of the hollow inner portion 79-1 of housing 71-1. Plunger 72-1 retains seal 75-1 to remain in contact with the hollow inner portion 79-1 such that fluid does not flow between plunger 72-1 and housing 71-1. In the illustrated example, seal 75-1 includes an O-ring. In other examples, seal 75-1 could be integrated into plunger 72-1 (e.g., a lip seal). Fluid is driven in or out of housing 71-1 (due to movement of plunger 72-1) through valve 76-1. In one example, valve 76-1 includes a star valve that reduces fluid dripping when loading or unloading cartridge 70-1. In another example, valve 76-1 broadly refers to a fluid path in or out of cartridge 70-1. Valve 76-1 can be inserted into filter 78-1 that filters the fluid prior to entering the sprayer.

Handle 74-1 can be removably coupled to plunger 72-1 using coupling 77-1 (such as a quarter turn coupling). As shown, handle 74-1 is coupled to plunger 72-1. Handle 74-1 can be rotated to release coupling 77-1 and then be removed from housing 71-1. To facilitate this rotating handle 74-1 can have a T-shaped feature on the end distal from the coupling 77-1. End cap 73-1 is removable for disassembly and/or seal lubrication. In some examples, end cap 73-1 encloses hollow inner portion 79-1 from atmosphere which can allow a pressure supply to bias plunger 72-1 in a given direction (e.g., a vacuum can be created to actuate plunger 72-1 in a draw direction or pressure can be increased to bias plunger 72-1 towards valve 76-1, see FIG. 21 for such an end cap 73-1).

In another example, the hollow inner portion containing fluid could be enclosed within a collapsible liner (e.g., polymetric material or other suitable material) positioned between the fluid and the housing wall.

Figure 10B:
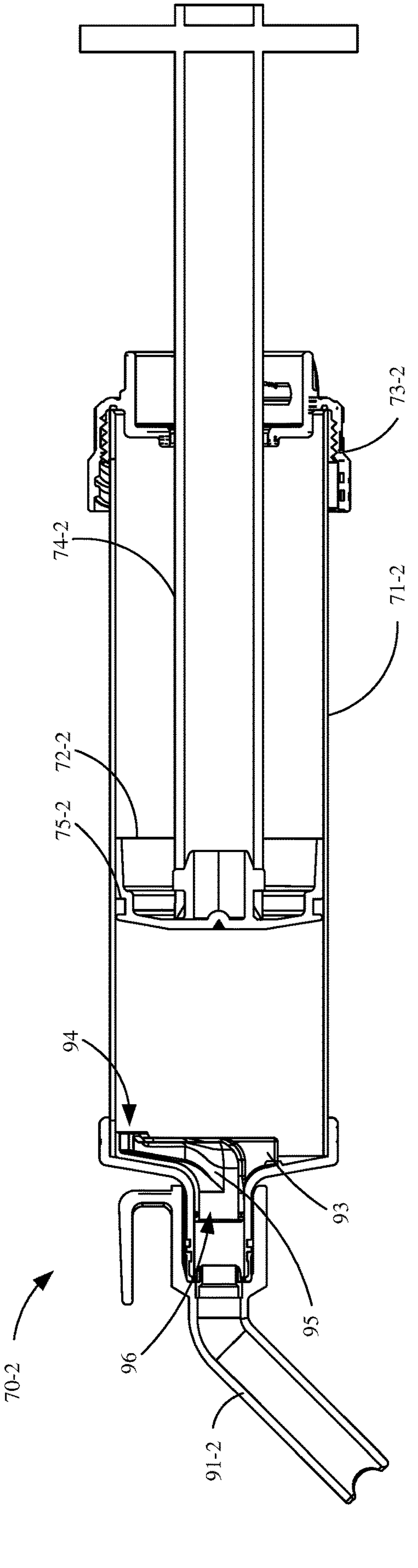
FIG. 10B is a sectional view of a cartridge for a fluid sprayer.

FIG. 10B is a sectional view of a cartridge 70-2 for a fluid sprayer, such as the sprayer shown in FIGS. 5-7. Some components of cartridge 70-2 in FIG. 10B are similar or analogous to those in FIG. 10A and they are similarly numbered. Cartridge 70-2 includes a pickup assembly 91-2 and outlet offset device 93-2. Pickup assembly 91-2 couples to cartridge 70-2 and extends from the end of cartridge 70-2 so that it can draw fluid from a source without submersing the valve of cartridge 70-2 into the fluid.

Outlet offset device 93 can be disposed in housing 71-2 to offset the centrally located inlet/outlet of cartridge to a side of cartridge 70-2. Fluid flows through outlet offset device 93 through a fluid channel 95 which has an inlet 94 and an outlet 96. The offset created by outlet offset device 93 can be used to separate air and fluid within housing 71-2. For example, since air will rise above the fluid in housing 71-2, the cartridge 70-2 can be oriented as shown, which places the air at the inlet 94 of outlet offset device 93 and driving plunger 74-2 in the expel direction will expel the air before fluid (e.g., purging air from housing 71-2). Conversely, inverting the orientation of cartridge 70-2 when loaded into the sprayer will place inlet 94 on the lower side of housing 71-2 such that air expulsion through outlet offset device 93 is reduced until the fluid in housing 71-2 is very low. Air that enters a fluid sprayer during a spray operation can be problematic as it can cause pressure fluctuations and/or affect the spray pattern.

Figure 10C:
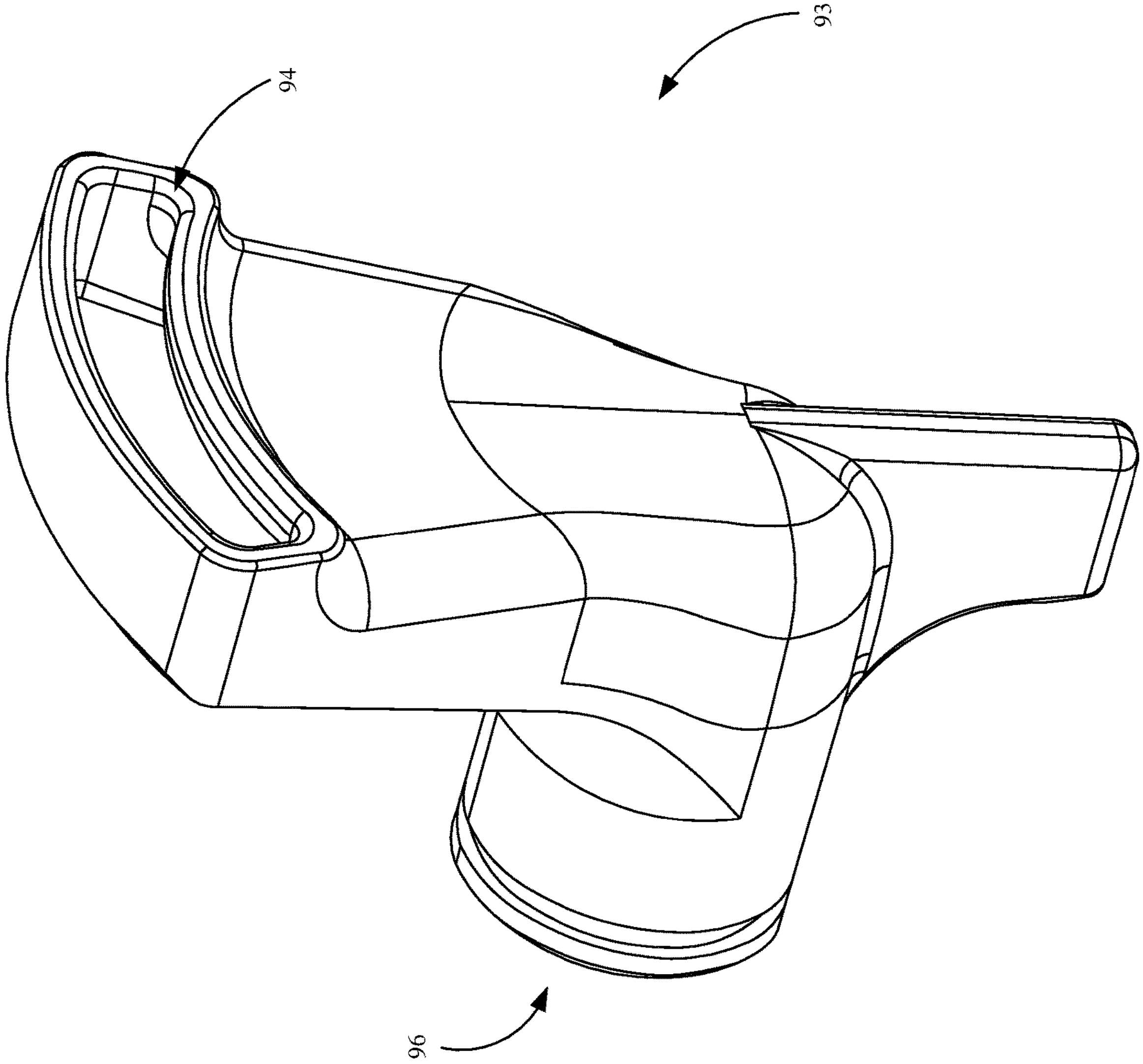
FIG. 10C is a perspective view of an example outlet offset device.

FIG. 10C is a perspective view of an example outlet offset device 93. As shown, inlet 94 includes a wide inlet that, for example, contours to the interior of housing 71-2. This shape and width can allow for a more effective or complete purging of air. The width and/or shape can also allow for less air flow in the fluid stream in more orientations than a narrower or different shape. In other examples, inlet 94 can be wider, narrower, or shaped differently. Outlet offset device 93 also includes an outlet 96 through which fluid is dispensed (or received if the cartridge 70-2 is drawing a fluid).

Figure 10D:
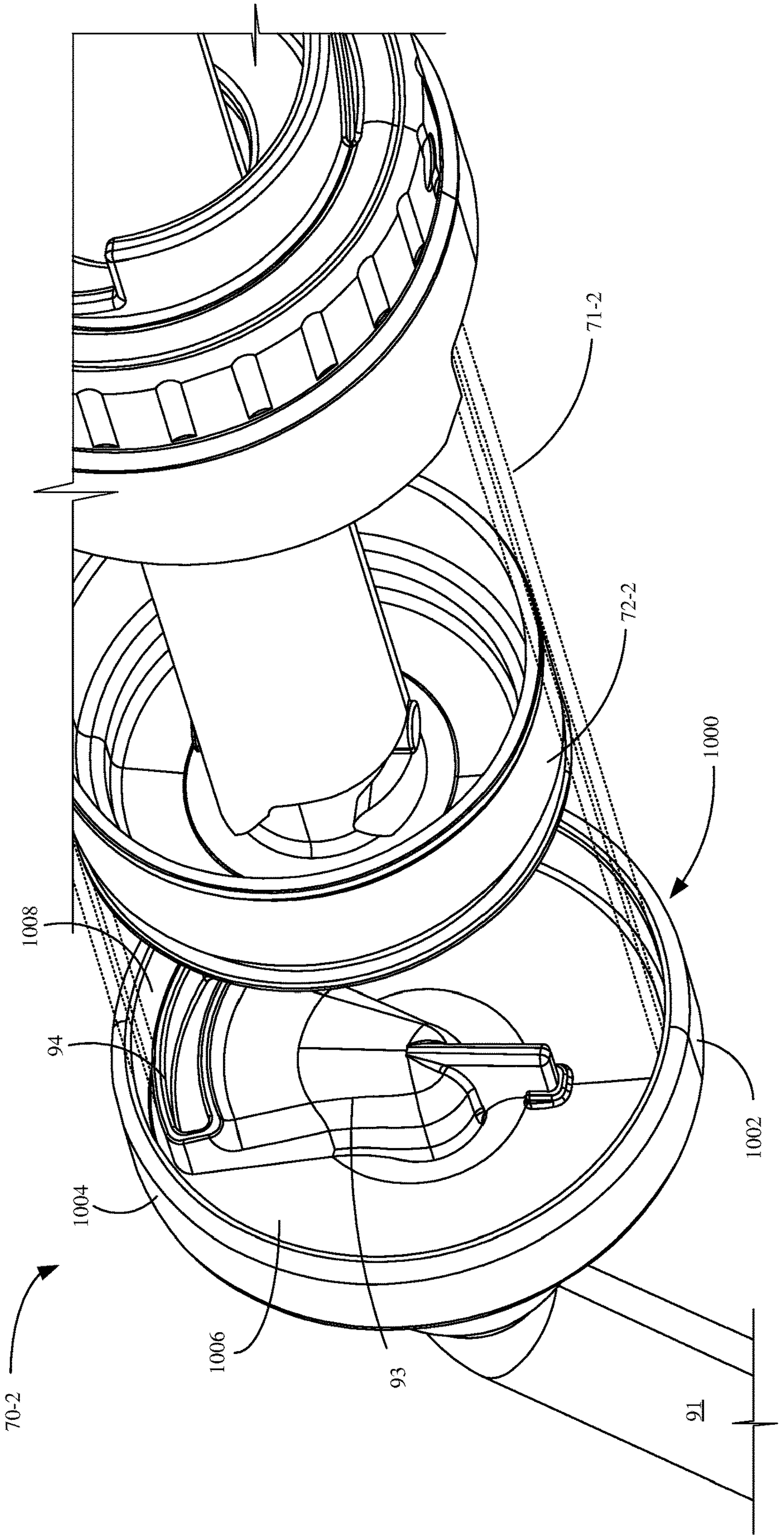
FIG. 10D is a perspective view of outlet offset device within a cartridge housing.

FIG. 10D is a perspective view of outlet offset device 93 within a cartridge housing 71-2. Cartridge 70-2, as shown, includes a front cap 1000 which has an inner face 1006 and a side wall 1008. Outlet offset device 93 couples to inner face 1006 to direct fluid in or out of cartridge 70-2 at a non-centralized point (e.g., inlet 94). As shown inlet 94 is disposed outward a distance from inner face 1006 and laterally a distance from side wall 1008. This orientation of inlet 94 helps keep air from entering inlet 94 because air will tend to ride along either inner face 1006 or side wall 1008.

Because of inlet 94 being on the interior of cartridge 70-2 and not externally visible it may be difficult for a user to orient cartridge in the correct way. Accordingly, indicia of orientation can be provided on the exterior of cartridge 70-2. For example, top indicia 1002 (e.g., text stating "TOP") is located on the top of cartridge 70-2 and bottom indicia 1004 (e.g., text stating "BOTTOM") is located on the bottom of cartridge 70-2.

Figure 10E:
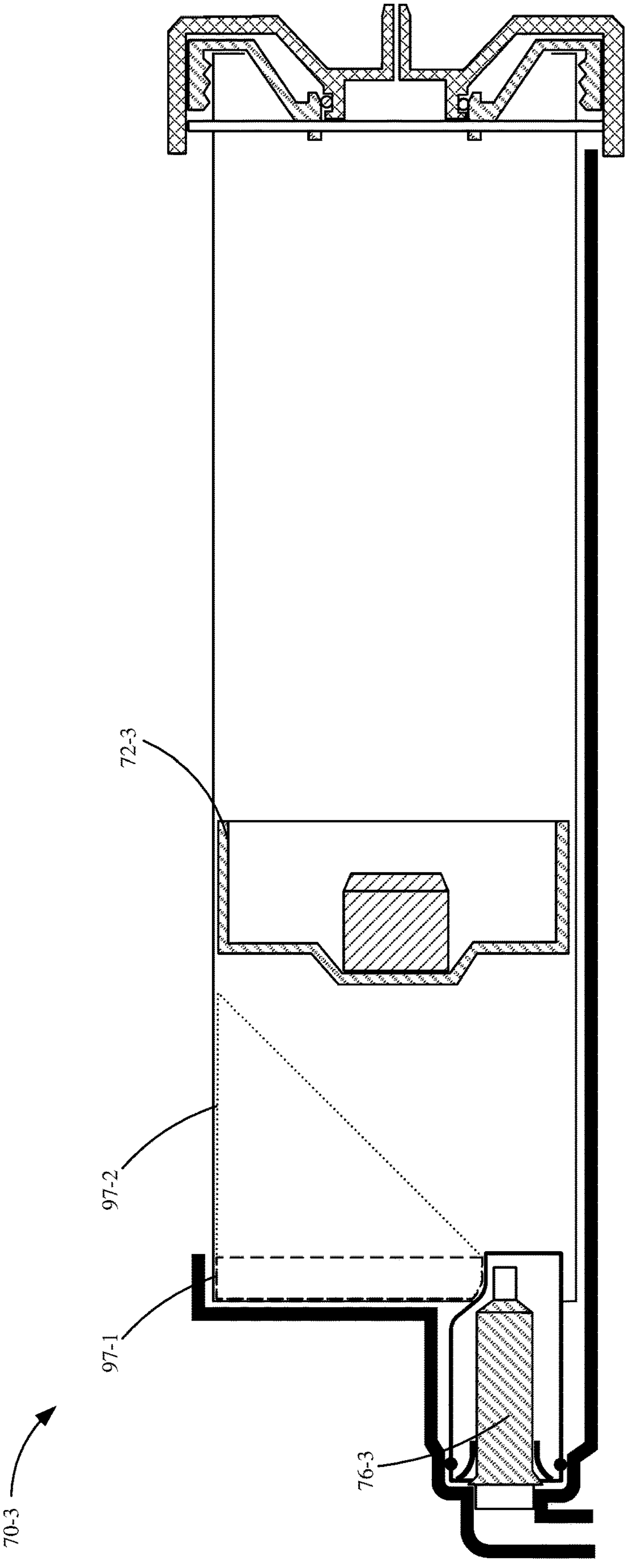
FIG. 10E is a sectional view of an example cartridge.

FIG. 10E is a sectional view of an alternative example cartridge 70-3. As shown, valve 76-3 is offset from the center of cartridge 70-3. This configuration can provide similar benefits as those described with respect to outlet offset device 93. For example, when oriented to spray overhead, air will generally travel to area 97-1, away from valve 76-3 where fluid is output, which reduces air being received by a fluid applicator during a spraying operation. As another example, when oriented to spray upward at an angle, air will generally travel to area 97-2 away from valve 76-3 where fluid is output, which reduces air being received by a fluid applicator during a spraying operation.

Figure 11:
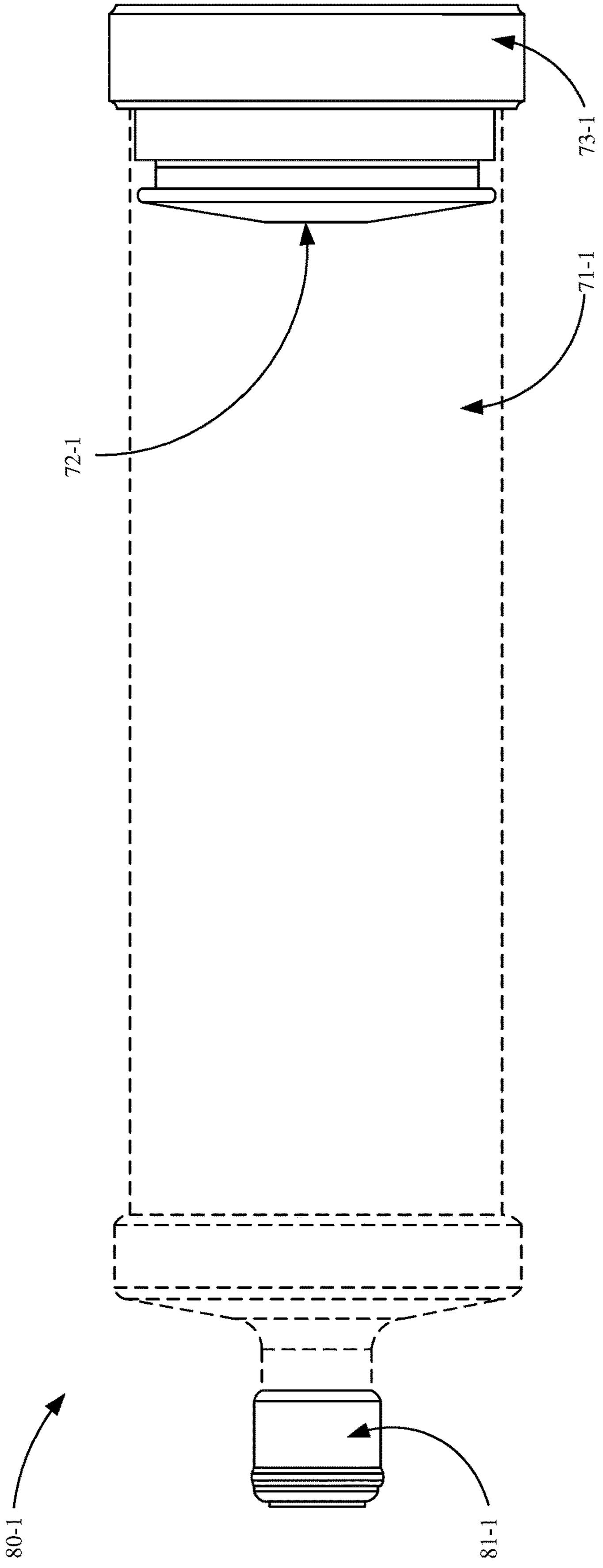
FIG. 11 is a diagrammatic view of one example of a cartridge for a fluid sprayer.

FIG. 11 is a side view of cartridge 70-1 for a fluid sprayer. Cartridge 70-1 includes a housing 71-1, a plunger 72-1, a valve cap 81-1 and an end cap 73-1. The valve cap can retain a fluid in housing 71-1 while cartridge 70-1 is not in use. This can allow a user to carry several cartridges 70-1 at a time and quickly swap them out without fluid leaking from the cartridges.

Figure 12A:
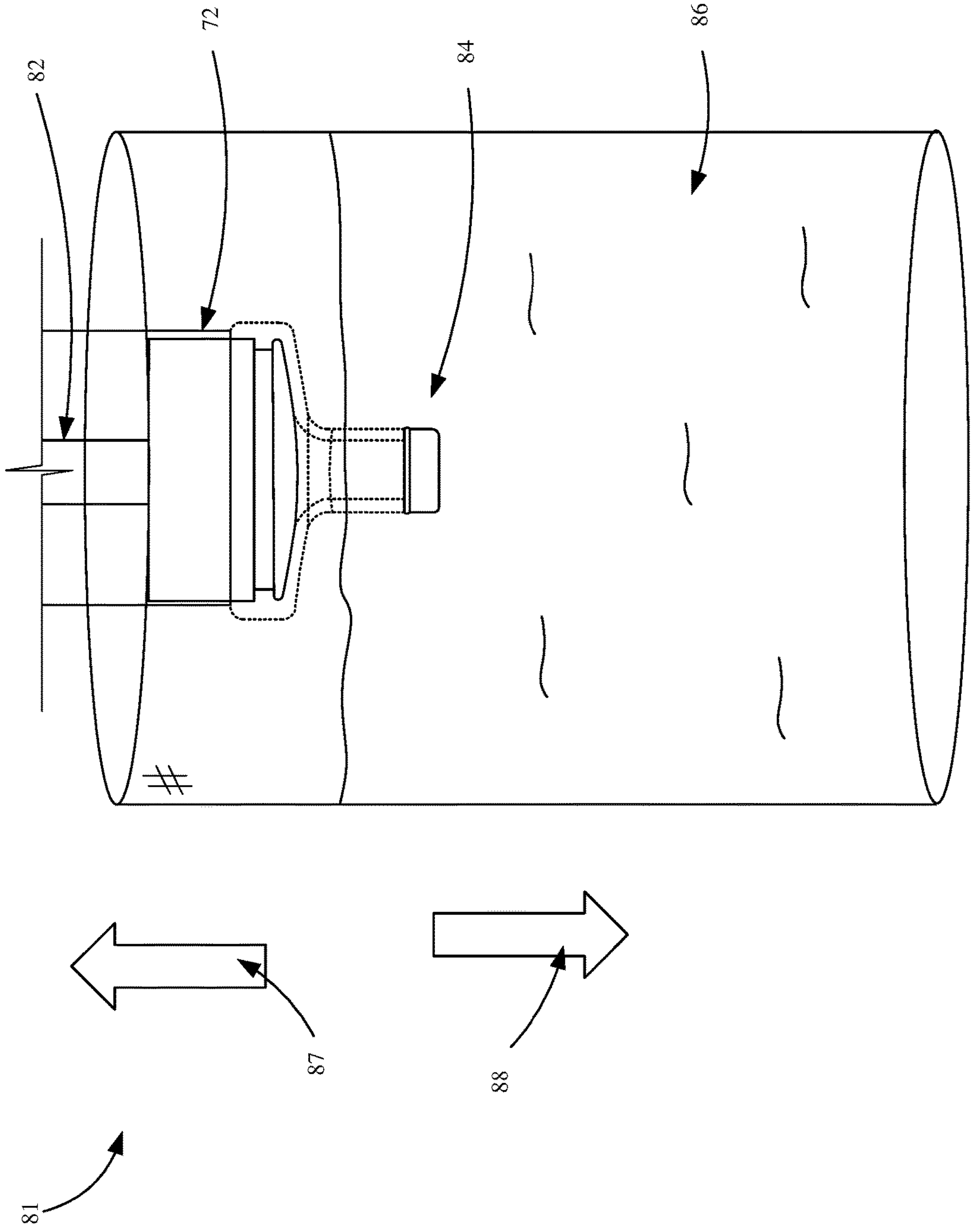
FIG. 12A is a diagrammatic view representing an example method of filling a cartridge.

FIG. 12A is a diagrammatic view representing a method of filling a cartridge. To fill cartridge 80, valve 84 of cartridge 80 is placed into a fluid. Then, using handle 74, plunger 72 can be pulled in the draw direction (represented by arrow 87), which creates a vacuum in housing 71 and pulls fluid into the cartridge 80. To expel a liquid from cartridge 80, handle 82 is pushed in the expel direction (represented by arrow 88).

An example method of cleaning cartridge 80 is to place valve 84 into a cleaning solution and repeatedly move handle 82 back and forth between the draw direction and the expel direction.

Figure 12B:
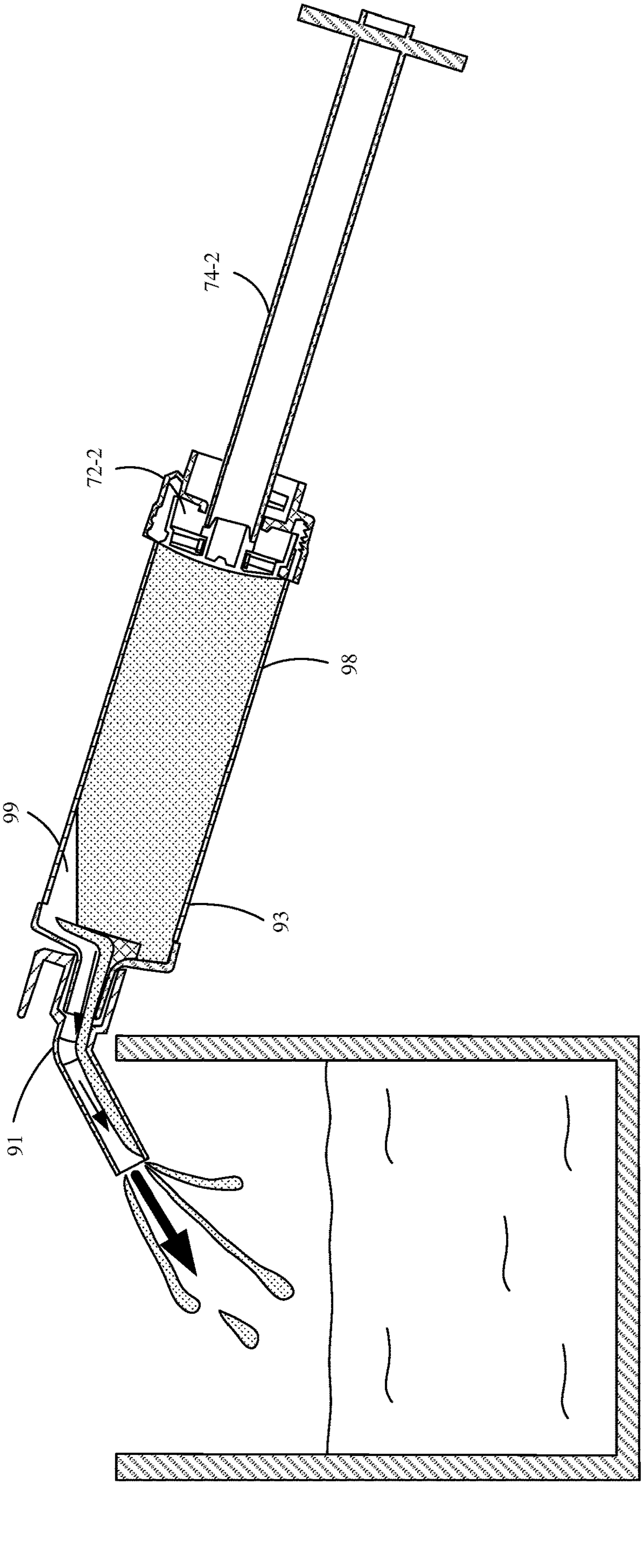
FIG. 12B is a diagrammatic view showing an example method of purging air from a cartridge.

FIG. 12B is a diagrammatic view showing a method of purging air from a cartridge. To purge the air from cartridge 70-2, cartridge 70-2 can be oriented as shown. This causes fluid 98 to settle as shown and air 99 to float to the top of cartridge 70-2 where it aligns with inlet 94 of outlet offset device 93. Then when plunger 72-2 is urged in the expulsion direction (e.g., by actuating handle 74-2) air 99 is expelled. Once fluid 98 begins to be the primary expelled component, the user may determine that a majority of air 99 has been expelled from cartridge 70-2, since air 99 is biased upward generally towards inlet 94.

Figure 13A:
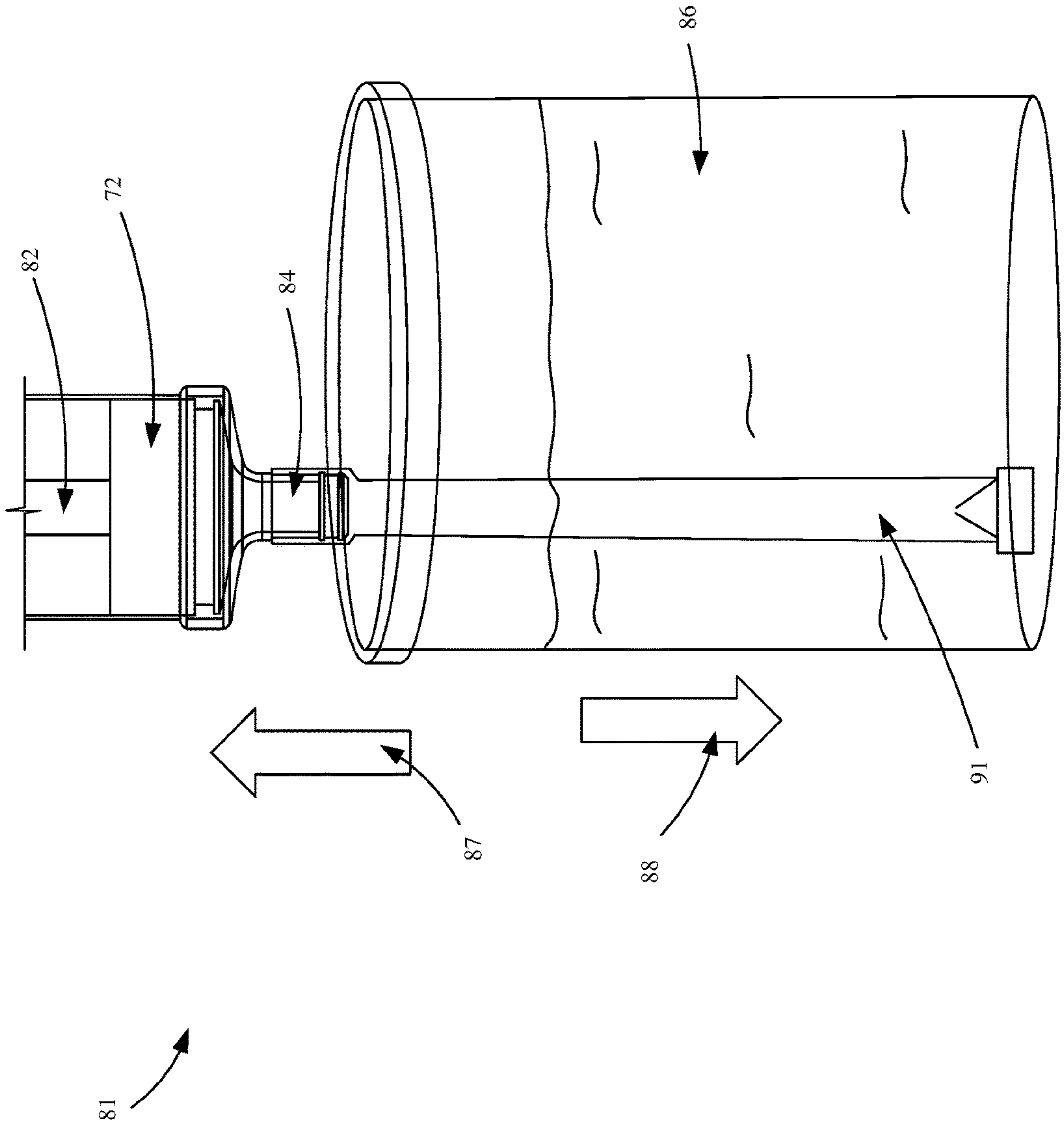
FIG. 13A-13B are diagrammatic views of example methods of filling cartridge.

FIG. 13A is diagrammatic view of example cartridge 80 being filled. Cartridge 80 of FIG. 13A is similarly filled in a similar way as cartridge 80 in FIG. 12. However, cartridge 80 in FIG. 13A is not directly inserted into the fluid, rather cartridge 80 fluidly couples to a pickup assembly 91 that is inserted into the fluid. This way, cartridge 80 does not get fluid around the edge of valve 84.

Also, pickup tube 91 can be coupled to a fluid sprayer directly. In one example, pickup assembly 91 would be coupled to the refill cavity of the sprayer (e.g. see FIG. 7). This would allow a user to draw fluid out of a container and refill their cartridge without removing cartridge 80 from the sprayer. As shown, pickup assembly 91 includes a check valve 92. Check valve 92 allows fluid to be drawn through pickup assembly 91 but does not allow fluid to flow out of pickup assembly 91. Check valve 92 reduces dripping from pickup assembly 91 during the refilling process.

Figure 13B:
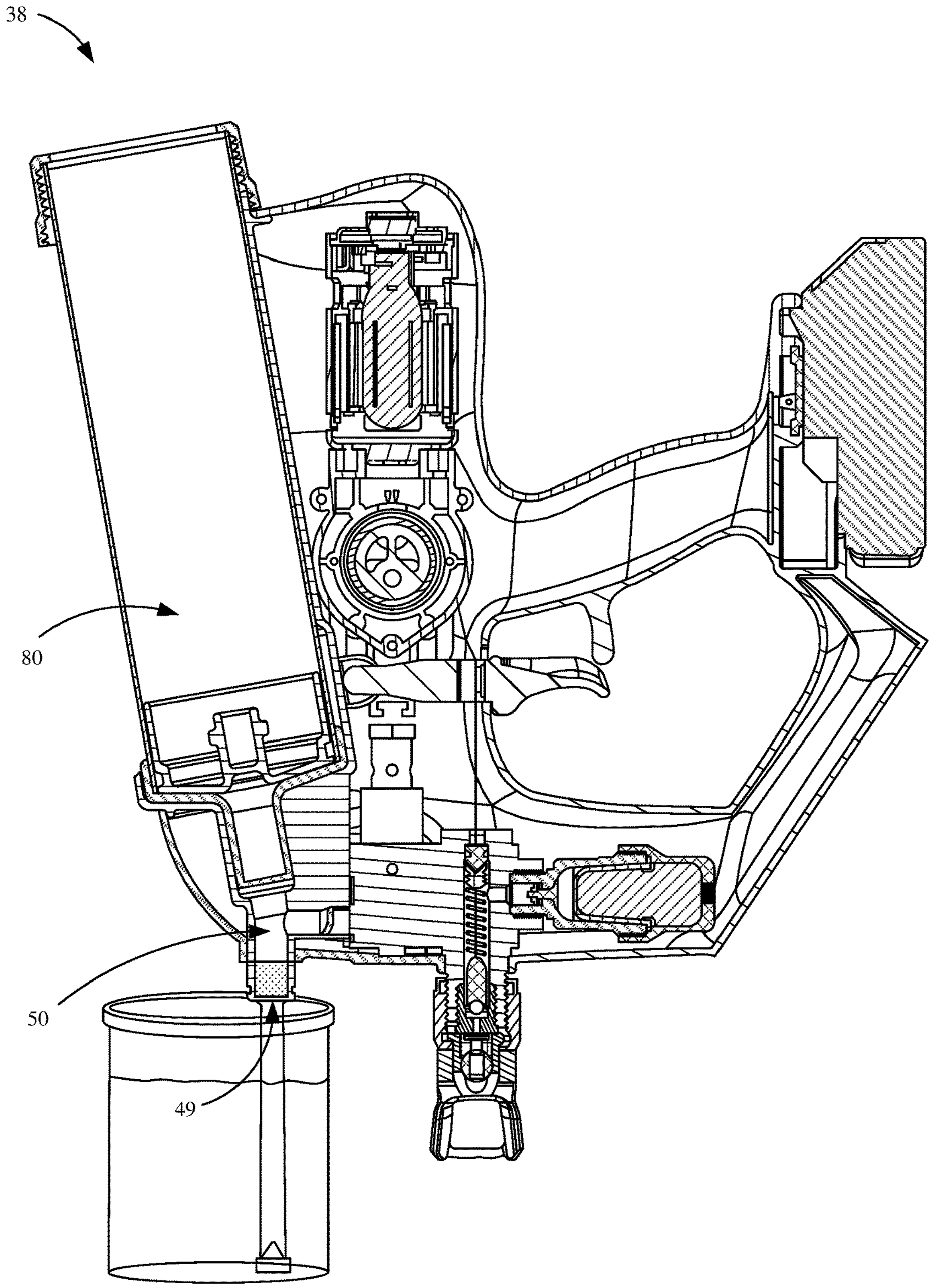

FIG. 13B is a diagrammatic view of example cartridge 80 being filled while attached to example applicator 38 from FIG. 7. As shown, cap has been removed and pickup assembly 91 has been inserted into refill port 49 to create a fluid path from the fluid container to cartridge 80. As a plunger in cartridge 80 is actuated in the draw position (e.g., manually by a user actuating the plunger with a handle, automatically by reversing a fluid pump to create a vacuum behind the plunger, etc.) fluid is pulled from the fluid source through the pickup assembly 91 into cartridge 80. In some examples, refill port 49 or refill cavity 50 includes a check valve which reduces or prevents fluid from being expelled from refill port 49.

Figure 14:
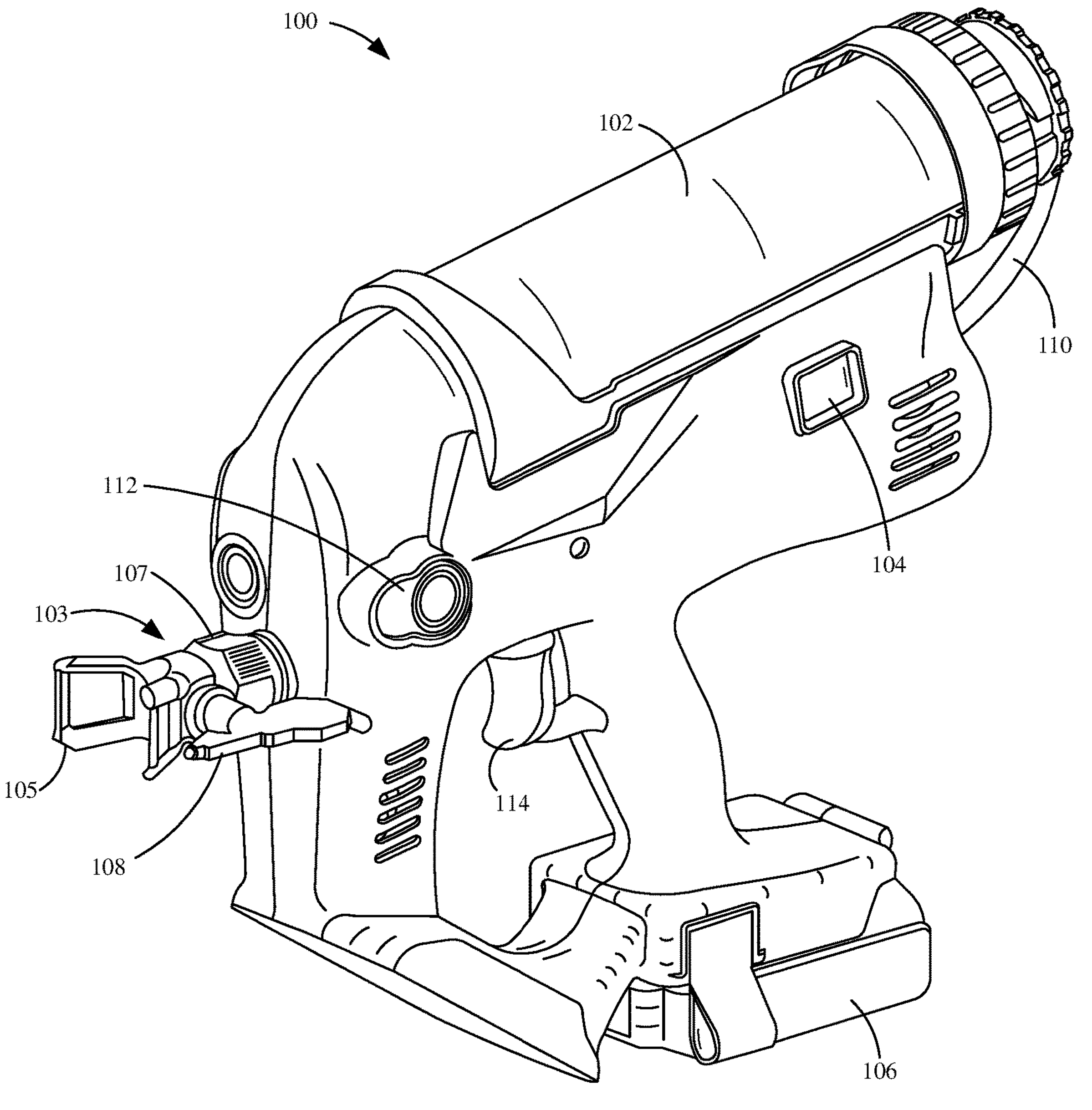
FIG. 14 is a perspective view showing an example cartridge feed fluid sprayer.
Figure 15:
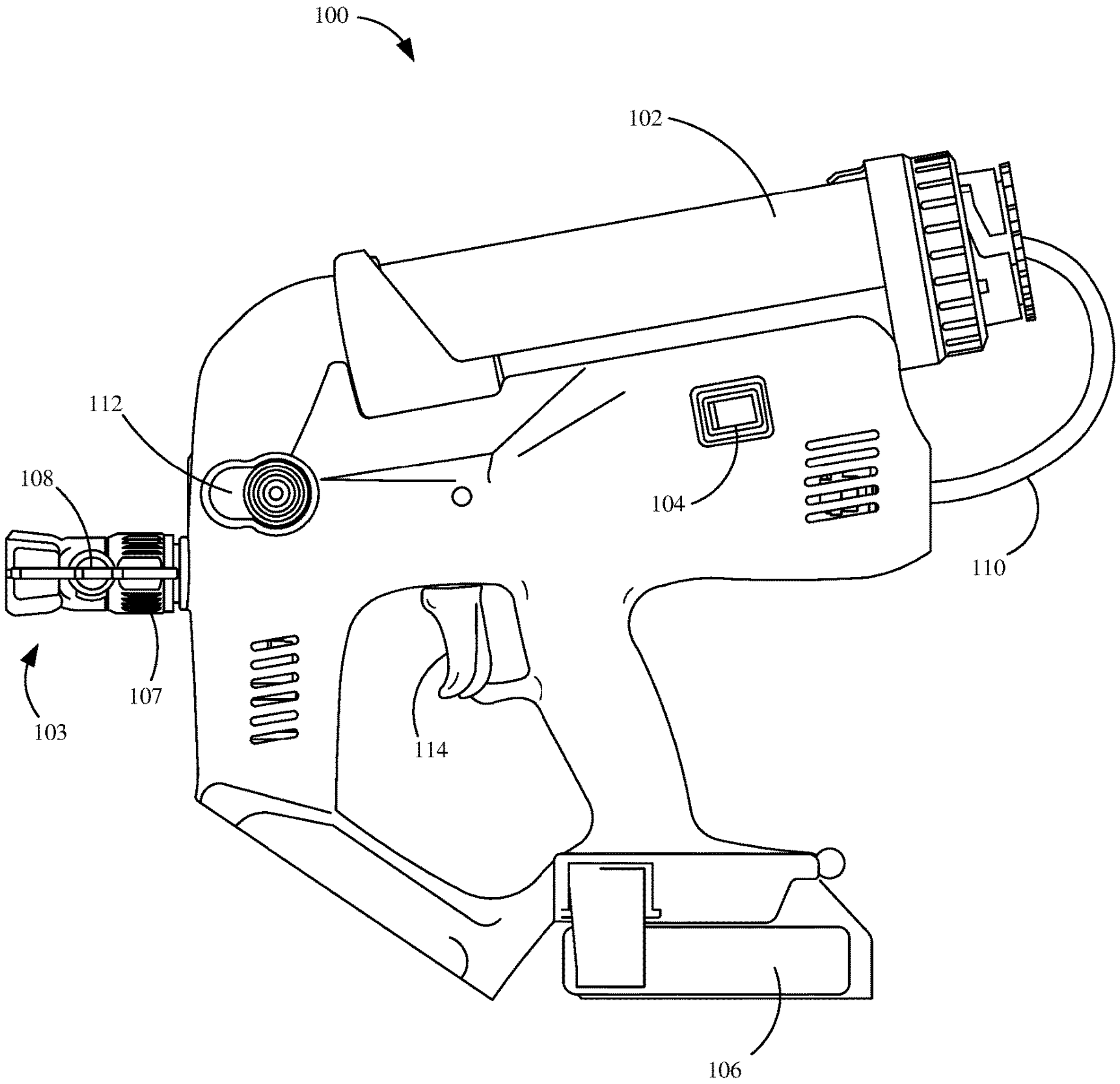
FIG. 15 is a side elevation view showing an example cartridge feed fluid sprayer.

FIGS. 14 and 15 are perspective and side elevation views, respectively, showing an example cartridge feed fluid sprayer 100. Sprayer 100 includes cartridge 102, power switch 104, battery 106, outlet assembly 103, pressure line 110, primer 112 and trigger 114. Power switch 104 actuates to allow power from battery 106 to a motor within sprayer 100.

Trigger 114 actuates to allow fluid flow from cartridge 102 to outlet assembly 103. For example, trigger 114 opens a valve (not shown in FIGS. 14 and 15) within sprayer 100 and/or starts the pump that pressurizes the fluid. Primer 112 primes a pump that is driven by a motor to pump fluid from cartridge 102 to outlet assembly 103. Primer 112, in some examples, can also be used to relieve pressure in the fluid path.

Pressure line 110 pressurizes a rear portion of cartridge 102 aiding in delivery of the fluid from cartridge 102 to outlet assembly 103. For example, pressure line 110 can deliver a pressurized air into a cavity rearward of a plunger in cartridge 102 such that the pressurized air forces the plunger forward which pushes fluid out of cartridge 102. Pressure line 110 can be a flexible or rigid body. In one example, pressure line 110 is formed in a channel in the body of sprayer 100 that makes a connection with cartridge 102 or the tank upon coupling of cartridge 102 or the tank to the applicator.

Outlet assembly 103 includes safety feature 105, coupler 107 and tip 108. Outlet assembly 103 is removably couplable to sprayer 100. For example, as shown, coupler 107 is rotationally actuated to either couple or remove outlet assembly 103 from sprayer 100. In other examples, coupler 107 can include a quick connect or other mechanism to couplet outlet assembly 103 to sprayer 100.

Figure 16:
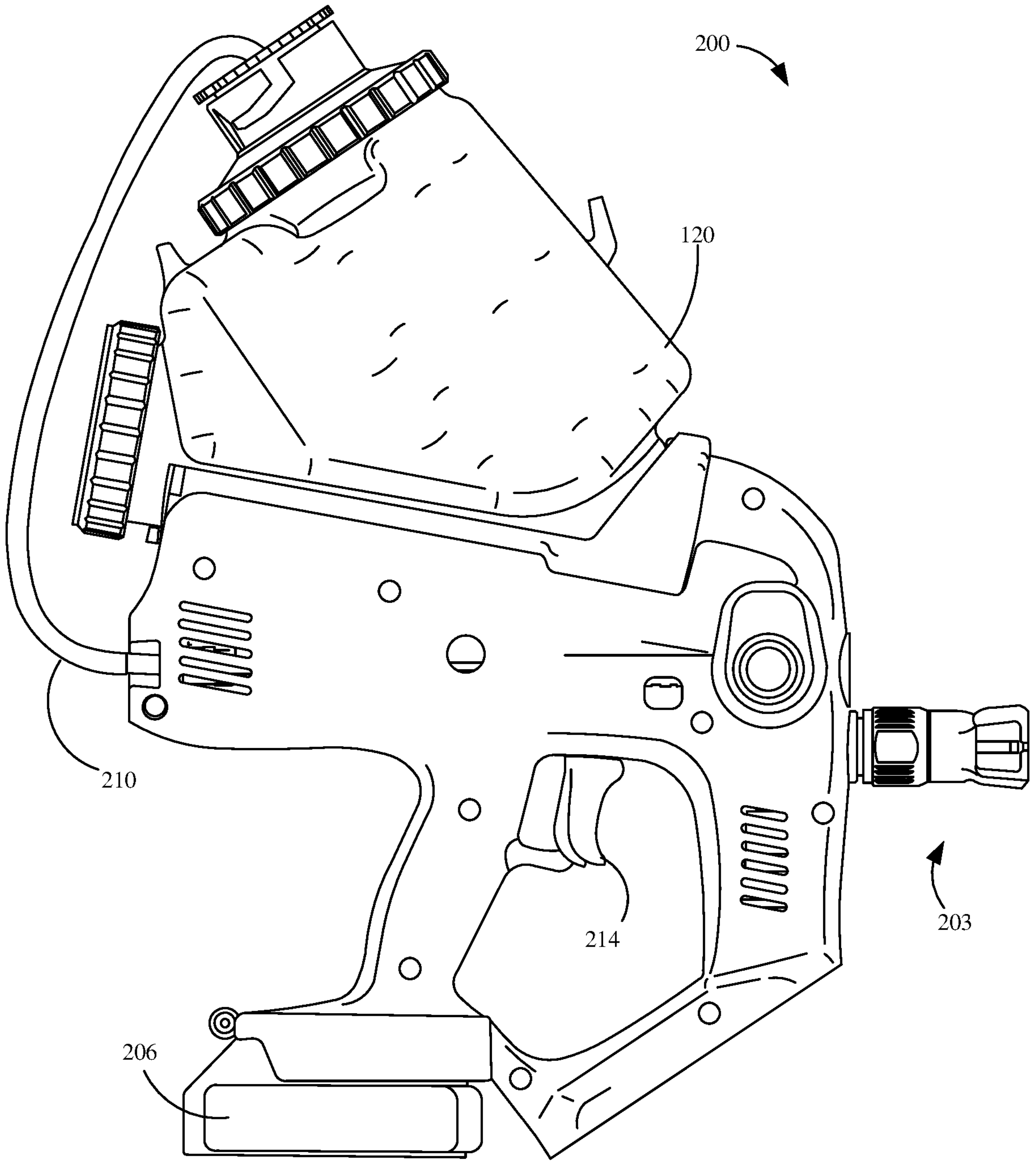
FIG. 16 is a side elevation view showing an example cartridge feed fluid sprayer.

FIG. 16 is a side elevation view showing an example tank feed fluid applicator 200. Applicator 200 includes tank 120, outlet assembly 203, battery 206, pressure line 210 and trigger 214. In one example, outlet assembly 203, battery 206, pressure line 210 and trigger 214 are similar to outlet assembly 103, battery 106, pressure line 110 and trigger 114 in FIG. 14. In this example, cartridge 102 in FIG. 14 has been replaced by tank 120. Tank 120 can provide similar functions as those described with respect to cartridge 102.

Figure 17:
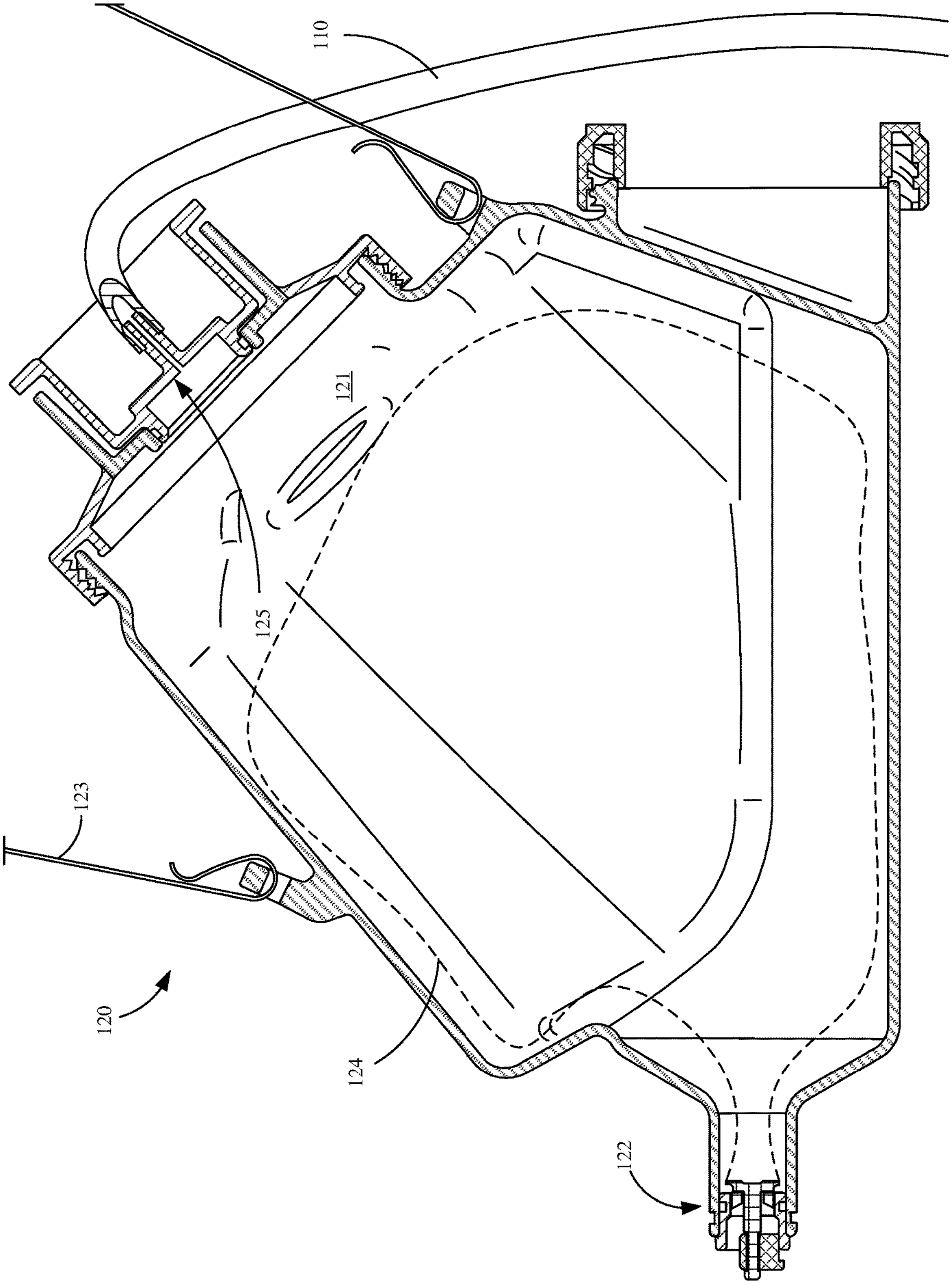
FIG. 17 is a sectional view showing an example fluid storage device.

FIG. 17 is a sectional view of tank 120. Tank 120 includes reservoir 121, outlet 122, pressure line 110, strap 123 and pressure inlet 125. Reservoir 121 stores a fluid to be applied. Outlet 122 allows fluid into or out of reservoir 121. In some examples, outlet 122 is similar to the outlets described above with respect to the various cartridges in FIGS. 1-13.

Pressure line 110 couples to tank 120 at pressure inlet 125. Pressure line 110 supplies a pressure to reservoir 121 such that fluid in reservoir 121 is pressurized which assists fluid through outlet 122. For example, fluid in reservoir 121 may be in a liner 124 and when pressure builds between liner 124 and the interior of reservoir 121, the liner collapses and forces the fluid out of outlet 122. Strap 123 is coupled to tank 120 to allow a user hands-free carrying of tank 120 (and anything that may couple to tank 120, such as applicator 200).

Figure 18A:
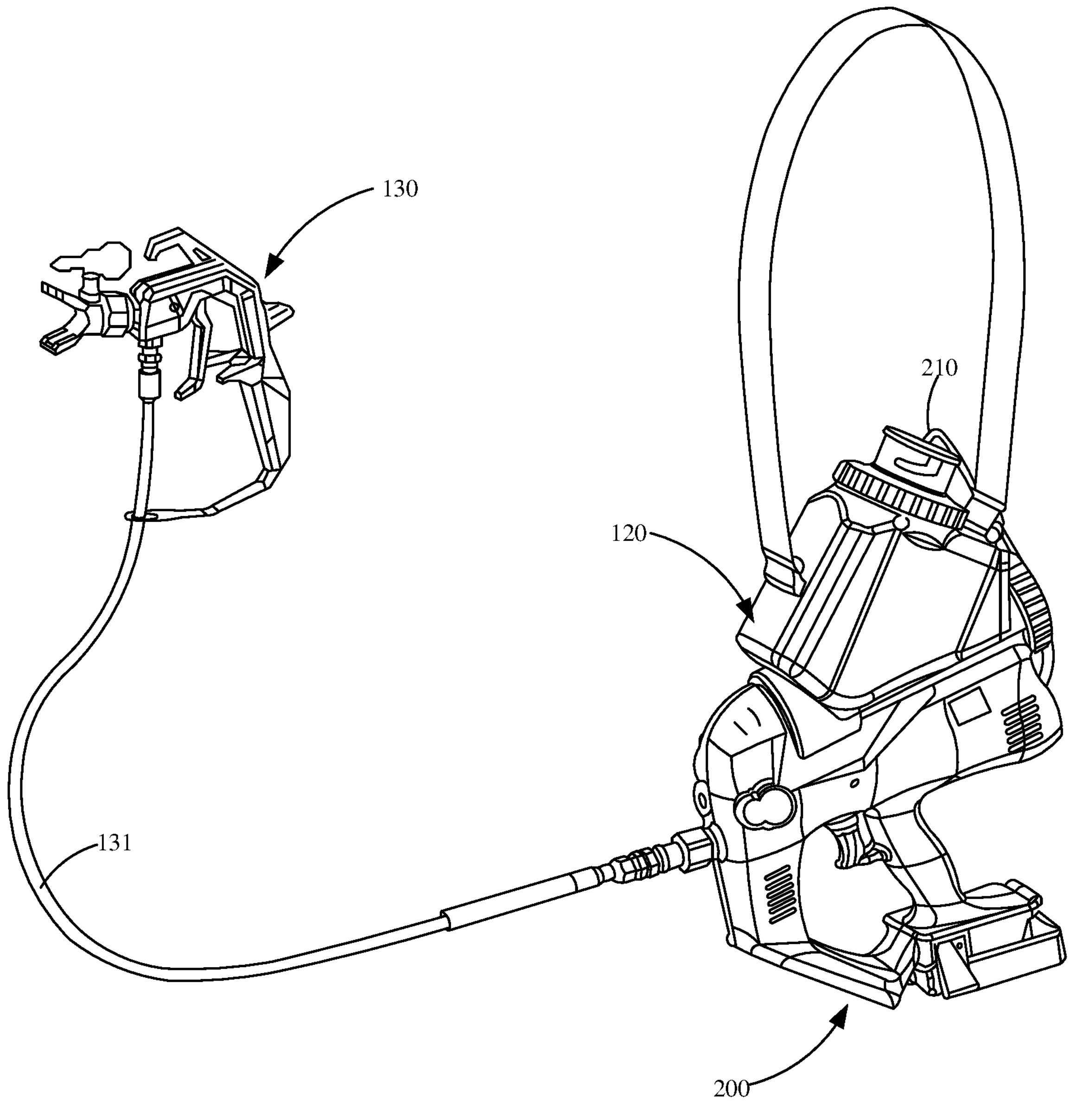
FIGS. 18A-18B are perspective views showing an example fluid storage device and sprayer assembly.
Figure 18B:
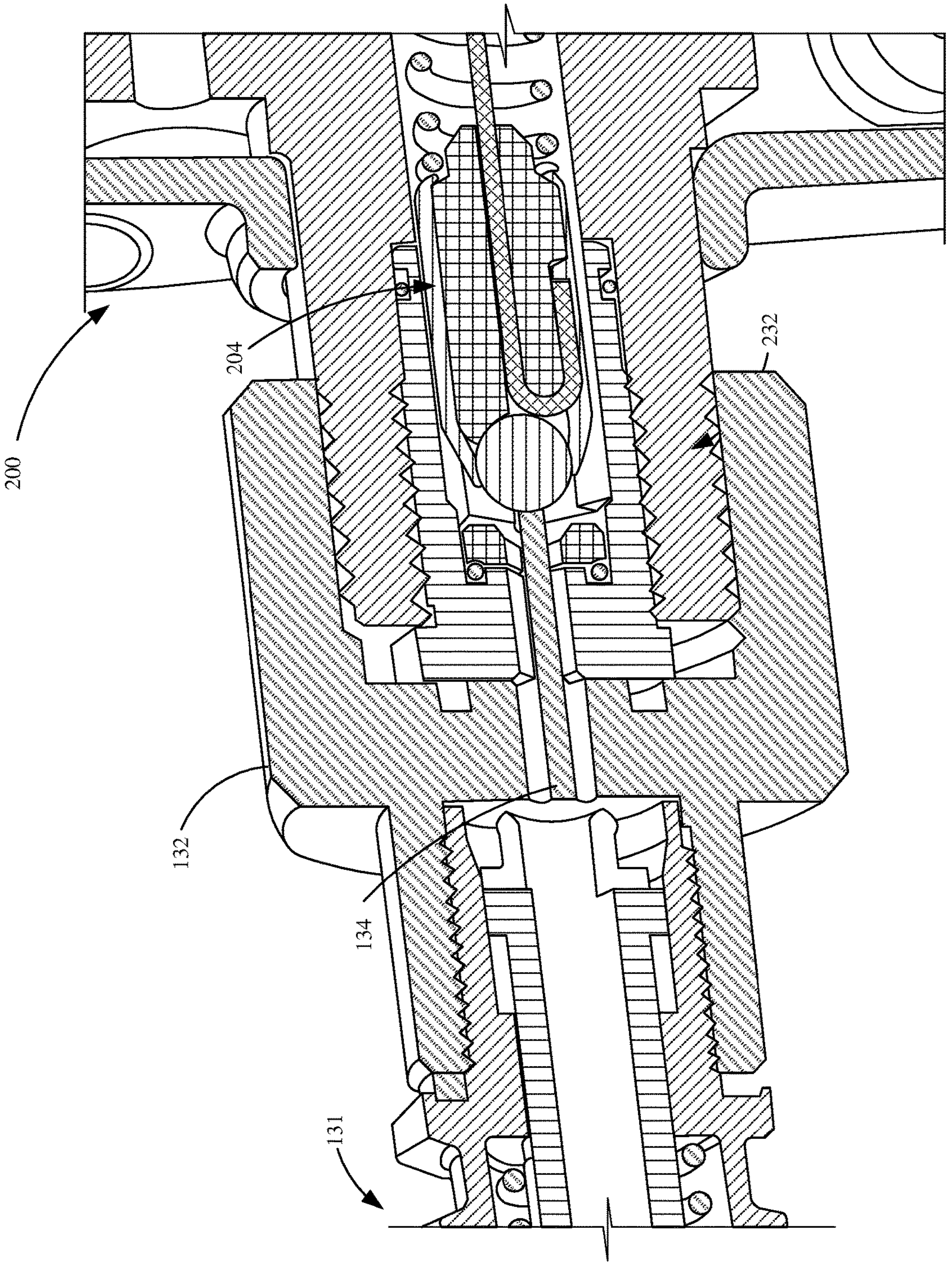
Figure 19:
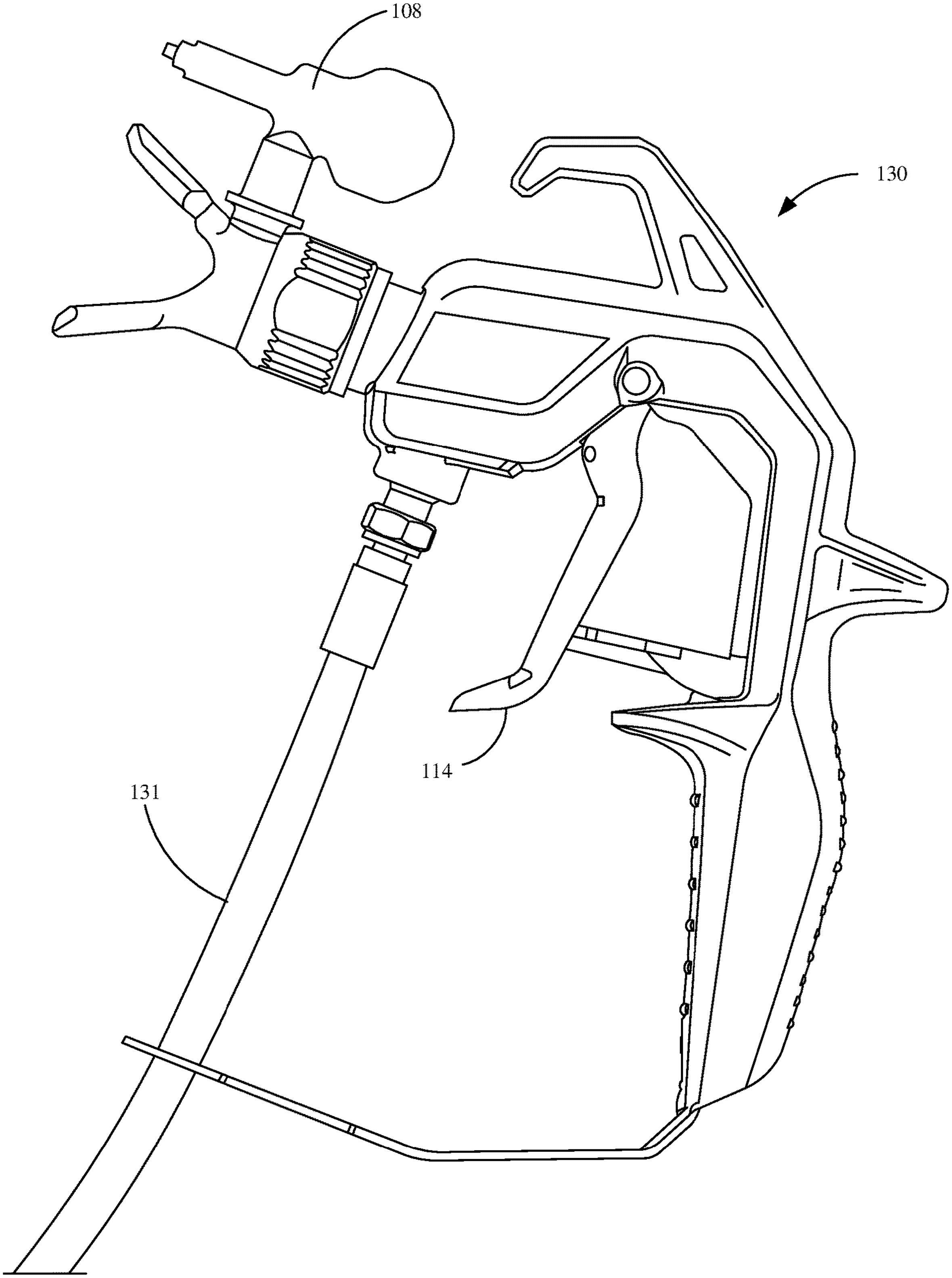
FIG. 19 is a side elevation view showing an example fluid sprayer.

In one example, applicator 200 can be used in a tethered whip configuration. FIGS. 18A, 18B and 19 show one example of a tethered whip configuration and/or parts thereof. The assembly as shown, in FIG. 18A includes an applicator 130, a hose 131 and applicator 200. Applicator 200 pumps the fluid from tank 120 through hose 131 to applicator 130. Applicator 130 receives and applies the fluid stored in tank 120. As shown, outlet assembly 103 is not coupled to applicator 200 and instead, hose 131 couples to applicator 200 at the outlet coupling mechanism.

FIG. 18B is a partial and sectional view showing an example connection between applicator 200 and hose 131. Hose 131 includes a coupler 132. Coupler 132 can be rotationally actuated to couple hose 131 to applicator 200. For example, threads of coupler 132 can engage corresponding threads 232 of applicator 200. In another example, hose 131 can have a coupler 132 that includes a quick release or another mechanism that couples to applicator 200.

Hose 131 also includes pin 134 that opens valve 204 of applicator 200 when hose 131 is coupled to applicator 200. Keeping the valve 204 of applicator 200 open allows a user to control fluid flow through actuation of the trigger associated with applicator 130 (e.g., trigger 114) rather than the trigger of applicator 200 (e.g., trigger 214). In another example, controlling fluid flow can involve a different combination of trigger or other actuations as well. Pin 134 can be rigidly joined to a portion of hose 131. For example, the pin can be press fit, chemically joined (e.g., glue, epoxy, etc.), or manufactured as part of hose 131 or coupler 132. Pin 134 as shown is in a cylindrical pin shape, however, in other examples pin 134 could include other geometric shapes as well.

In one example, threads 232 (or alternate outlet coupling mechanisms) of applicator 200 can interchangeably receive either hose 131 or an outlet assembly (for example outlet assembly 203).

FIG. 19 is a side elevation view showing applicator 130. Applicator 130 includes a tip 108 where a fluid is expelled from. Applicator 130 also includes a trigger 114 that allows fluid flow from hose 131 to tip 108. This is but one example and other applicators can also be used.

Figure 20:
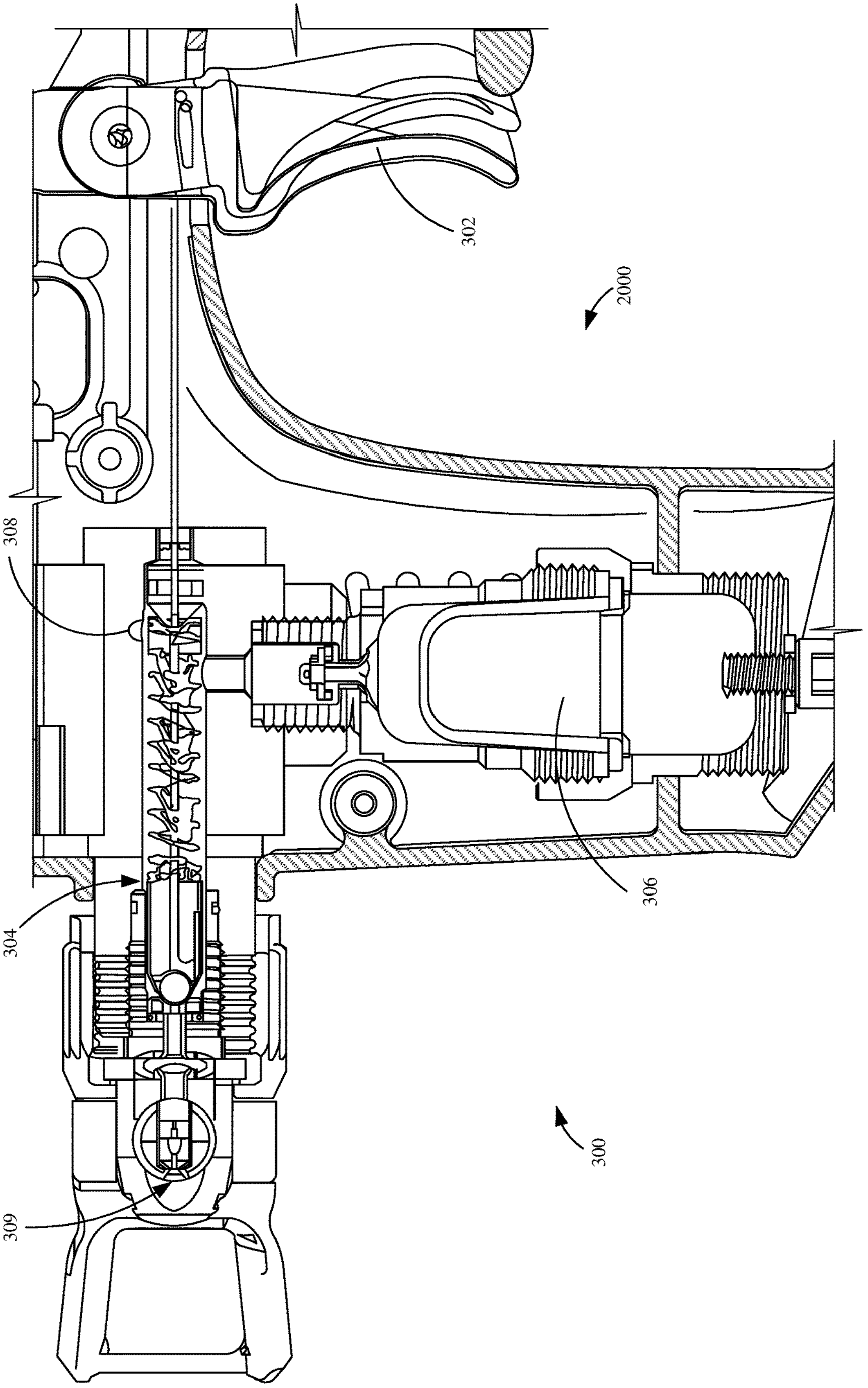
FIG. 20 is a sectional view showing an example needle valve and accumulator assembly.

FIG. 20 is a sectional view showing an example needle valve and accumulator assembly. The needle valve and accumulator assembly shares some similar components to the ones described above with respect to FIGS. 6-8. Assembly 2000 includes a trigger 302 that actuates to open valve 304. Fluid coming from a reservoir (e.g. a cartridge, tank, etc.) is pumped into valve 304 through fluid inlet 308. When fluid is pumped into the interior of valve 304 fluid also gets pumped into accumulator 306, where energy is stored. As described above, when a pump that is pumping the fluid in through fluid inlet 308 is in a retracting state, accumulator 306 releases the stored energy and maintains or reduces fluctuations of fluid pressure at outlet 309.

Figure 21:
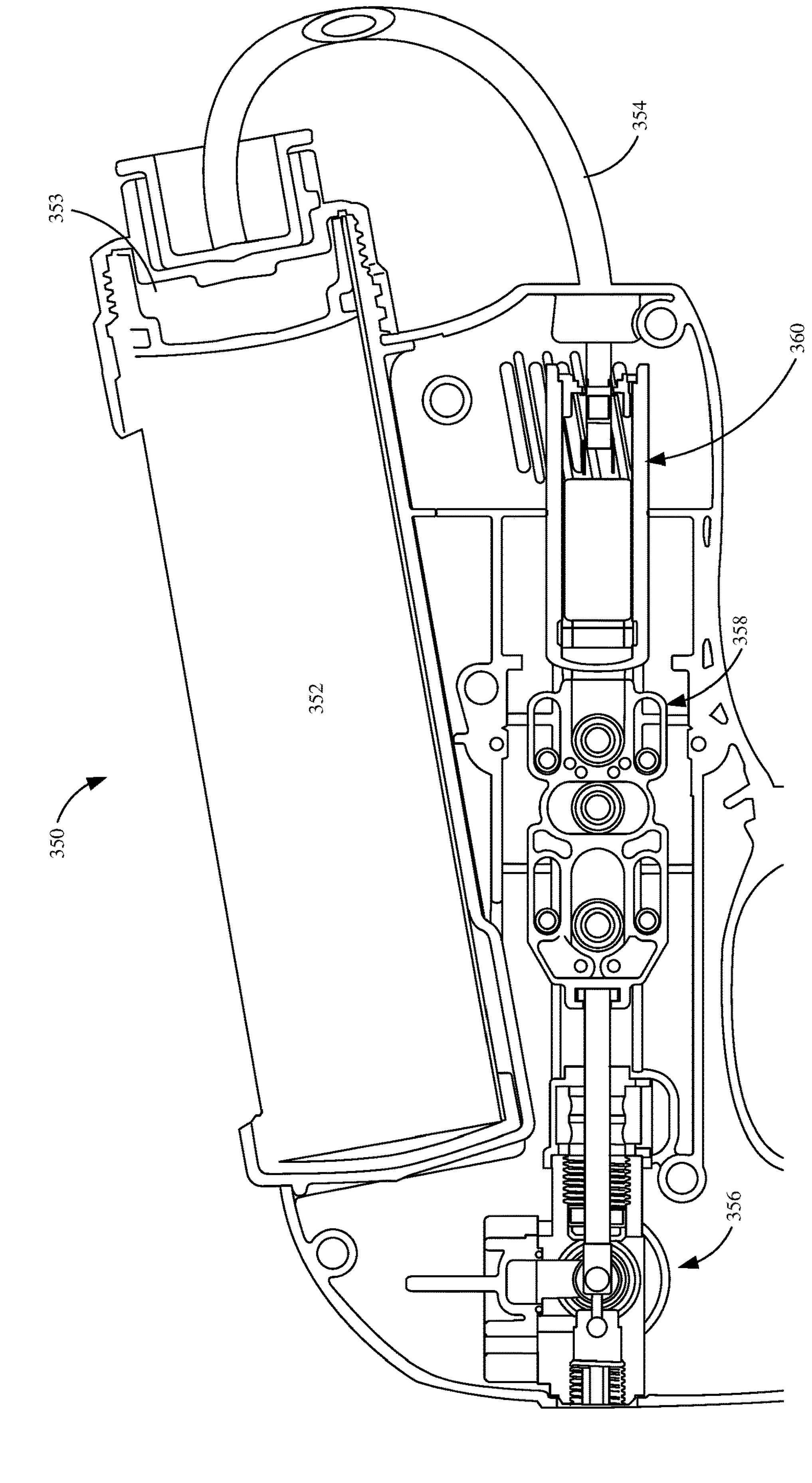
FIG. 21 is a sectional view showing an example cartridge and sprayer assembly.

FIG. 21 is a sectional view showing an example cartridge and sprayer assembly. The assembly includes cartridge 352, plunger 353, pressure line 354, pressure inlet 355, pump 356, end cap 357, scotch yoke 358 and pressure pump 360. A motor (not shown) drives motion that is translated into reciprocal motion by scotch yoke 358. The reciprocal motion generated by scotch yoke 350 can drive pump 356 and pressure pump 360. In other examples, scotch yoke 350 can be replaced by another mechanism that translates rotational motion into reciprocating motion. Pump 356 pumps fluid from cartridge 352 to a valve (such as valve 304 in FIG. 20). Pressure pump 360 pumps air (or some other fluid) through pressure line 354 into a rear area of cartridge 352 through a pressure inlet 355 in end cap 357 to assist in moving of plungers 353. In some examples, pressure inlet 355 is not part of the end cap 357 and is otherwise part of cartridge 352.

Figure 22:
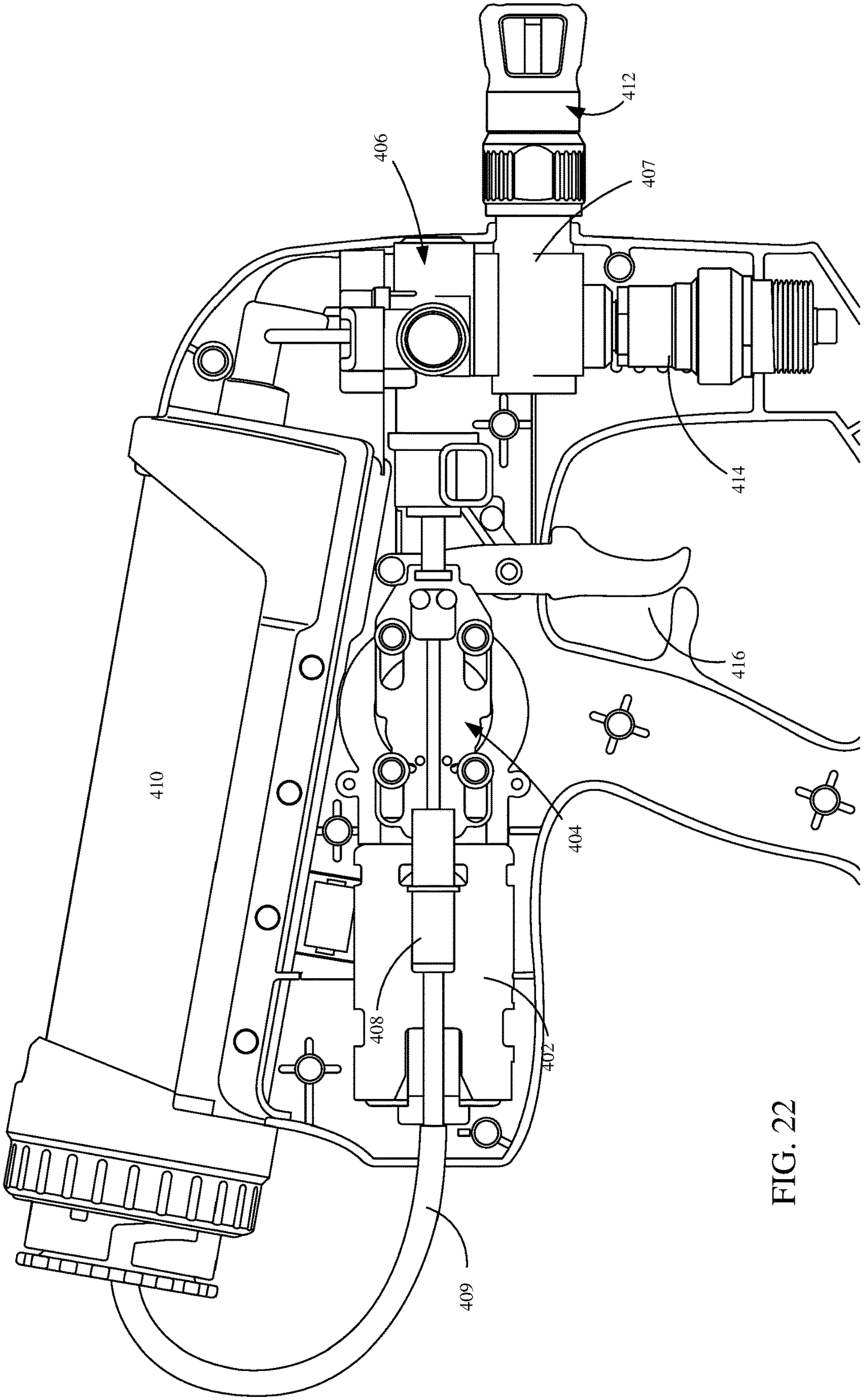
FIG. 22 is a component view showing an example sprayer.

FIG. 22 is a component view showing an example applicator 400. In FIG. 22, a side portion of a body of fluid applicator has been removed to show internal components of applicator 400. As shown, motor 402 drives motion of scotch yoke 404. Scotch yoke 404 translates the rotational motion of motor 402 into reciprocal motion that drives both pump 406 and pressure pump 408. In other examples, scotch yoke 404 can be replaced by another mechanism that translates rotational motion into reciprocal motion. Pump 406 pumps fluid from cartridge 410 into valve manifold 407. As pump 406 pumps fluid into valve manifold 407 it also pumps fluid into accumulator 414. Accumulator 414 can help to stabilize the pressure at tip 412 regardless of the state of pump 406 (e.g., driving or retreating). For example, accumulator 414 has a bladder or some other mechanism that stores energy that can be released when pump 406 is in a retreating state. Trigger 416 is actuated to open a valve in valve manifold 407 and allow fluid to be expelled through tip 412.

Pressure pump 408 is driven by scotch yoke 404 and pumps and air or some other fluid into a rear compartment of cartridge 410 to assist in delivering fluid to valve manifold 407, accumulator 414 and/or tip 412. Pressure pump 408 assists forcing fluid into cartridge 410 which helps overcome the drag of a plunger in cartridge 410 and also adds a positive pressure into the pump so it doesn't rely on (or only relies partially on) the vacuum developed by the pump 406 to prime. Pressure pump 408 could be used with a cartridge, tank or other reservoirs.

Figure 23:
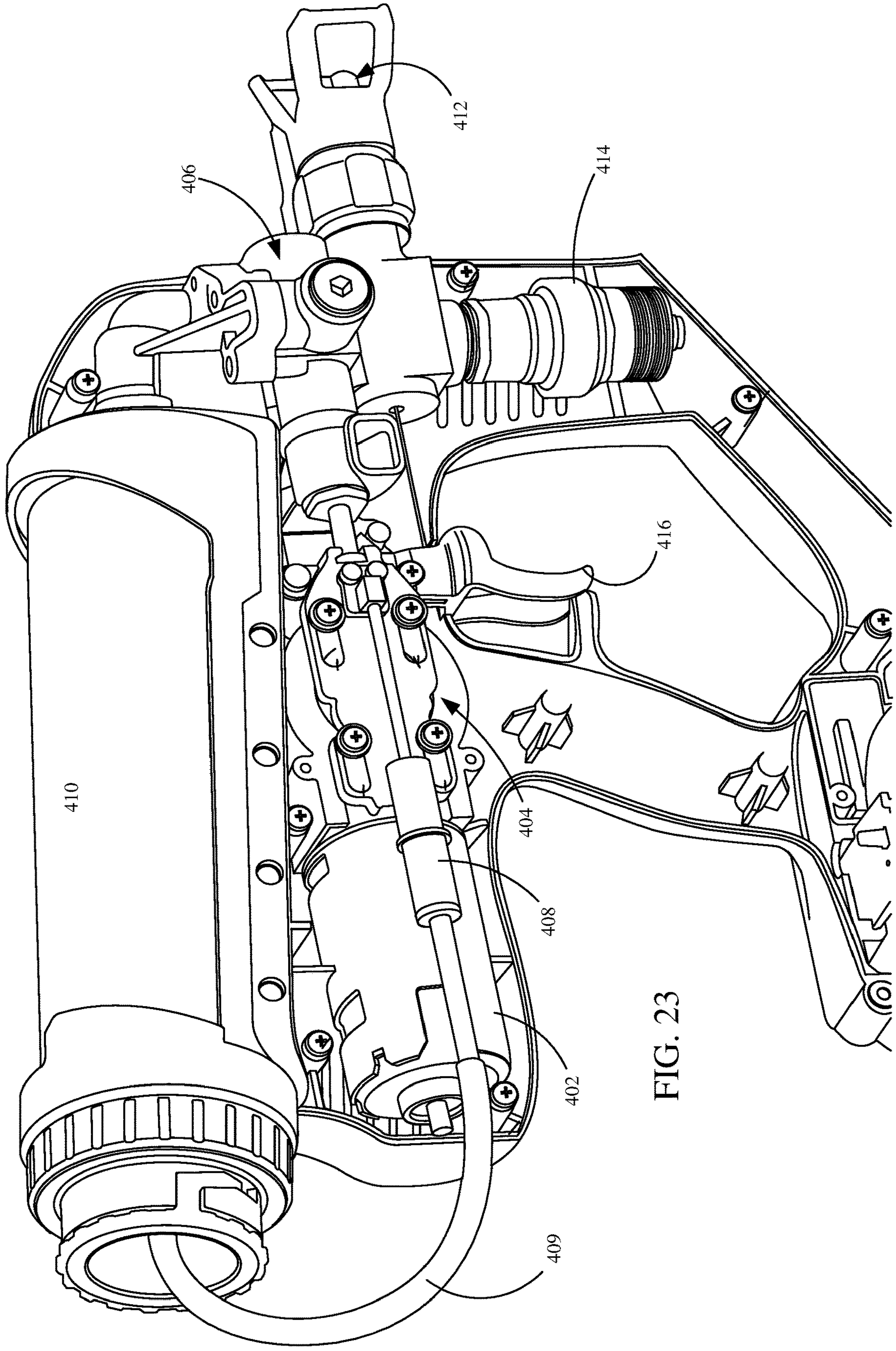
FIG. 23 is a component view showing an example sprayer.

FIG. 23 is a component view showing applicator 400. In the view of FIG. 23, a portion of the applicator body has been removed to expose internal components. The components shown in FIG. 23 are similar to those shown in FIG. 22 and they are similarly numbered. Additionally, shown in FIG. 23, is battery 420 which can provide a power source for motor 402. In another example, battery 420 is replaced by another power source. For example, an electrical cord can be plugged into applicator 400 to power motor 402 and other components of applicator 400.

Figure 24:
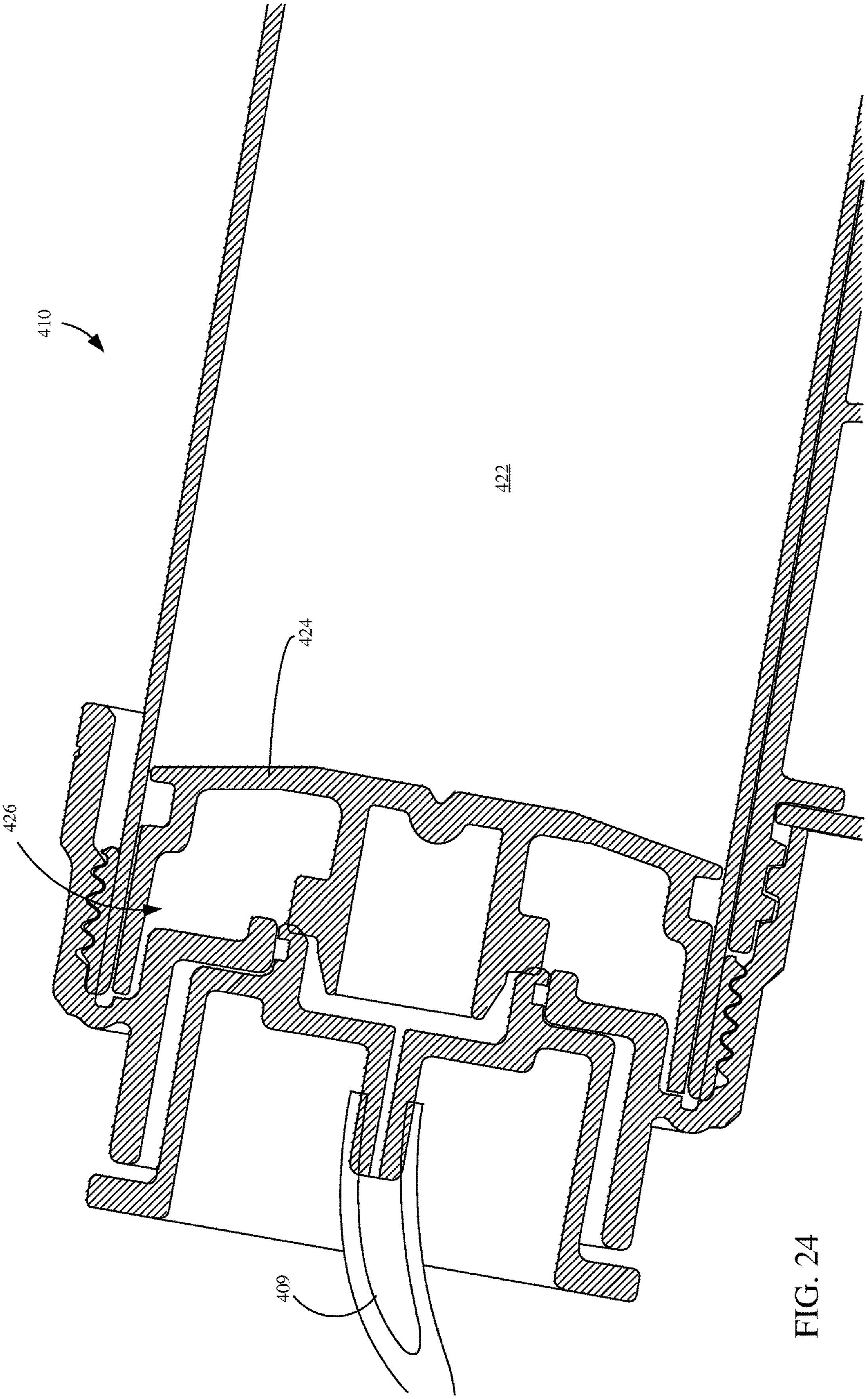
FIG. 24 is a sectional view showing an example cartridge.

FIG. 24 is a sectional view of cartridge 410. Cartridge 410 includes reservoir 422, plunger 424, pressure compartment 426 and is coupled to supply line 409. Supply line 409 receives a pressurized fluid (e.g. air) which pressurizes pressure compartment 426 and can assist in pushing plunger 424 deeper into reservoir 422 in a direction indicated by arrow 423, which forces fluid out an opposing and of cartridge 410 (for example into fluid applicator 400 to be expelled through tip 412).

Figure 25B:
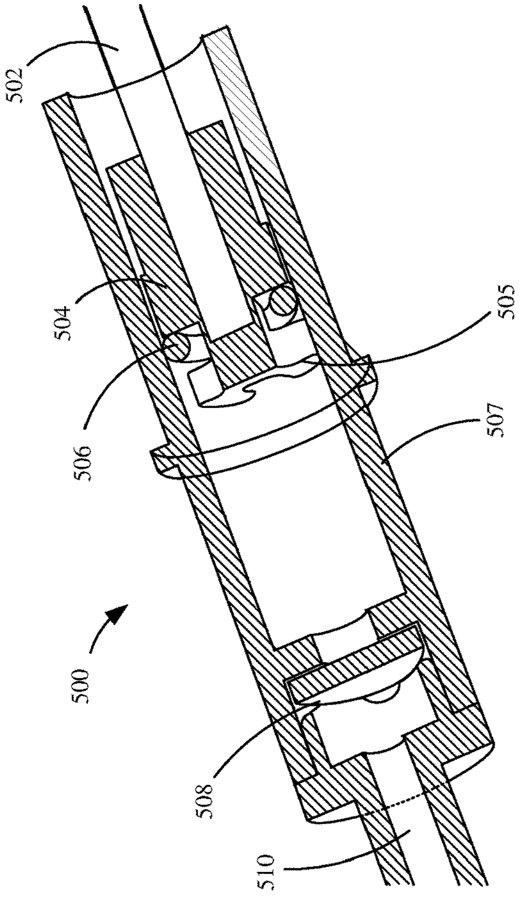
FIG. 25B is a sectional view showing the example fluid pump.
Figure 25A:
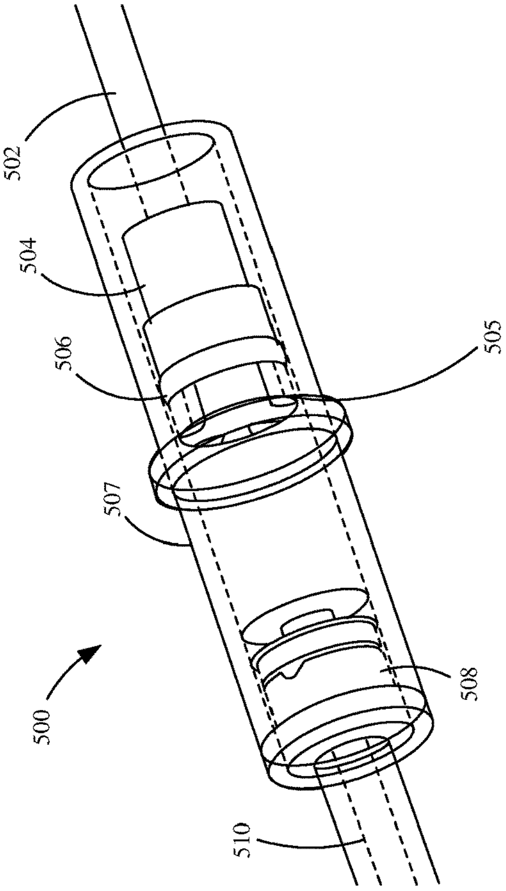
FIG. 25A is a partial transparent view showing an example fluid pump.

FIGS. 25A and 25B are partially transparent and sectional views, respectively, of an air pump 500. Air pump 500 is coupled to and powered by a drive rod 502. Drive rod 502 can be coupled to a reciprocating mechanism, such as scotch yoke 404. Drive rod 502 couples to and drives motion of piston 504. Displacement of piston 504 in housing or cylinder 507 causes pressurization and delivery of air to pressure line 510.

Piston 504 is configured to receive seal 506. When piston 504 is moving in a driving direction seal 506 creates a seal between piston 504 and cylinder 507 such that air is driven through pressure line 510. When piston 504 is moving in a retracting direction, seal 506 rests, but does not seal, on discontinuous component 505. Discontinuous component 505 allows air to fill cylinder 507 when piston 504 is retracting. Seal 506, in one example, includes a buna-nitrile O-ring. In other examples, seal 506 can be a different type of seal and/or includes different materials.

When piston 504 is retracting it creates a vacuum in cylinder 507. Check valve 508 helps prevent backwards flow of air, that is airflow from pressure line 510 to cylinder 507, from filling the vacuum. Because of check valve 508, the vacuum is filled by air that enters cylinder 507 through discontinuous component 505.

In one example, cylinder 507 includes a plastic, such as acetal, and piston 504 includes a plastic, such as polybutylene terephthalate. In other examples, cylinder 507 and piston 504 can include other materials as well.

Figure 26A:
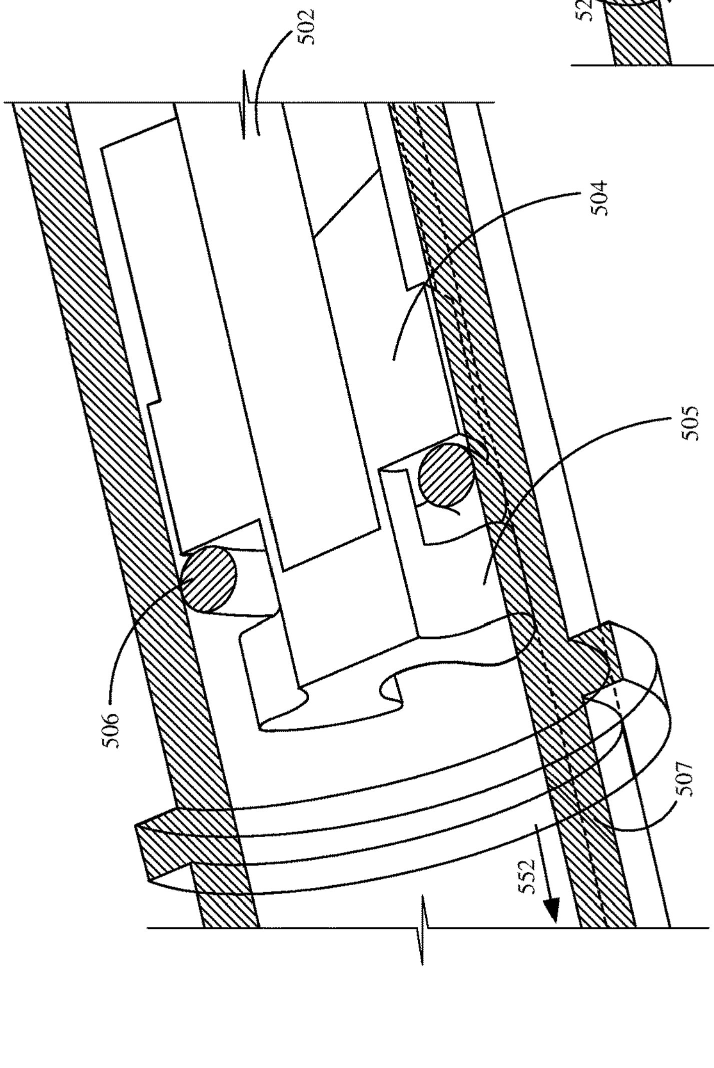
FIGS. 26A and 26B is a sectional view showing an example fluid pump.

FIG. 26A is a sectional perspective view of air pump 500 in a compressing or driving state. In this state, piston 504 is moving in a direction shown by arrow 552. Also, in this state, seal 506 is in contact with the body of piston 504. This contact of seal 506 between piston 503 and cylinder 507 creates a seal such that air cannot flow in a direction shown by arrow 554, instead air flows in a directive indicated by arrow 552.

Figure 26B:
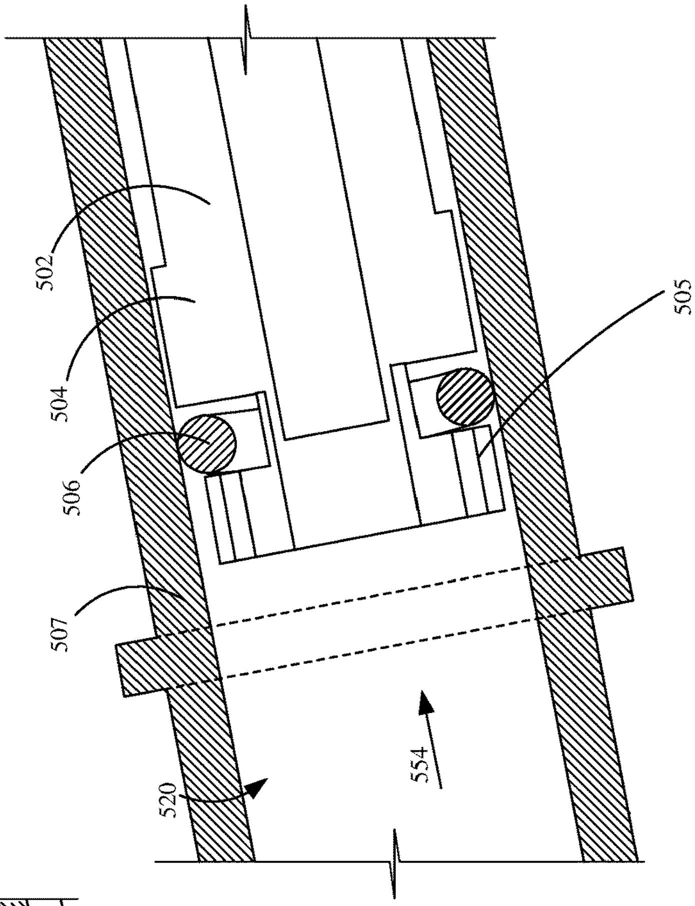

FIG. 26B is a sectional perspective view of air pump 500 in a retracting state. In this state, piston 504 is moving in a direction show by arrow 554. Also, in this state, seal 506 is in contact with discontinuous component 505 of piston 504. Because discontinuous component 505 is discontinuous, it allows air in or out of volume 520 through cavities in discontinuous component 505. The air that is received in volume 520 during the retracting state will later be forced out of volume 520 in the direction indicated by arrow 552.

While examples described herein are in the context of applying paint to a surface, it is understood that the concepts are not limited to these particular applications. As used herein, paint includes substances composed of coloring matter, or pigments, suspended in a liquid medium as well as substances that are free of coloring matter or pigment. Paint may also include preparatory coatings, such as primers, and can be opaque, transparent, or semi-transparent. Some particular examples include, but are not limited to, latex paint, oil-based paint, stain, lacquers, varnishes, inks, etc.

Example 1 is a fluid sprayer system of any or all previous examples comprising:

a fluid reservoir configured to store a fluid;

a pump configured to pump the fluid from the fluid reservoir to an outlet of the handheld fluid sprayer;

a handle; and a first trigger proximate the handle, configured to control fluid flow to the outlet;

a fluid hose having a coupling mechanism configured to removably couple to the handheld fluid sprayer proximate the outlet; and a fluid spray gun comprising:

a gun inlet configured to couple to the fluid hose and receive the fluid from the handheld fluid sprayer;

a gun outlet configured to expel the fluid in a spray pattern; and a second trigger configured to control fluid flow to the gun outlet.

Example 2 is a fluid sprayer system of any or all previous examples, wherein the first trigger actuates a valve of the handheld fluid sprayer that controls the fluid flow; and the coupling mechanism comprises a pin configured to mechanically actuate the valve of the handheld fluid sprayer when the fluid hose is coupled to the handheld fluid sprayer.

Example 3 is a fluid sprayer system of any or all previous examples, wherein the handheld fluid sprayer comprises a carrying strap.

Example 4 is a fluid sprayer system, comprising a first fluid sprayer comprising a first valve and a trigger configured to actuate the first valve to allow fluid from an inlet of the first fluid sprayer to an outlet of the first fluid sprayer;

a hose comprising:

a first end configured to fluidically couple to the inlet of the first fluid sprayer; and a second end comprising:

a threaded connection configured to couple to a second fluid sprayer; and a pin configured to mechanically actuate a second valve of the second fluid sprayer to an open position when the threaded connection is coupled to the second fluid sprayer.

Example 5 is a fluid sprayer system of any or all previous examples, wherein the second fluid sprayer comprises:

a fluid reservoir;

a battery; and a pump driven by a motor that is powered by the battery, the pump configured to pump the fluid from the fluid reservoir to a sprayer outlet proximate the outlet coupling mechanism.

Example 6 is a fluid sprayer system of any or all previous examples, wherein the first fluid sprayer is configured to be hand held by a user and the second fluid sprayer is configured to be carried by the user.

Example 7 is a fluid sprayer system comprising:

a fluid reservoir configured to store a fluid;

a fluid sprayer having an outlet coupling mechanism;

an outlet assembly comprising:

a spray tip and a first coupling mechanism configured to removably couple to the outlet coupling mechanism;

a fluid hose having a second coupling mechanism configured to removably couple to the outlet coupling mechanism; and a fluid applicator configured to couple to the fluid hose and receive the fluid from the fluid sprayer.

Example 8 is a fluid sprayer system of any or all previous examples, wherein the second coupling mechanism comprises a pin that opens a valve of the fluid sprayer when the second coupling mechanism is coupled to the outlet coupling mechanism.

Example 9 is a fluid sprayer system of any or all previous examples, wherein the fluid spraying comprises:

a battery; and a pump driven by a motor that is powered by the battery, the pump configured to pump the fluid from the fluid reservoir to a sprayer outlet proximate the outlet coupling mechanism.

Example 10 is a fluid sprayer system of any or all previous examples, wherein the fluid spraying further comprises:

a second pump that is driven by the motor, the second pump configured to pressurize the fluid reservoir.

Example 11 is a fluid sprayer system of any or all previous examples, wherein the outlet coupling mechanism comprises a first set of threads, the first coupling mechanism comprises a second set of threads that correspond to the first set of threads and the second coupling mechanism comprises a third set of threads that correspond to the first set of threads.

Example 12 is a fluid sprayer system of any or all previous examples, wherein the fluid reservoir is removably couplable to the fluid sprayer and interchangeable with a second fluid reservoir.

Example 13 is a fluid sprayer system of any or all previous examples, wherein the fluid sprayer comprises a carrying strap.

Example 14 is a fluid sprayer system of any or all previous examples comprising:

a refillable cartridge configured to store a fluid, the refillable cartridge comprising:

a housing defining an interior of the refillable cartridge that stores the fluid;

a plunger disposed in the housing and configured to actuate in a first direction to draw the fluid into the housing and to actuate in a second direction to expel the fluid out of the housing;

an inlet configured to couple to the refillable cartridge and receive the fluid from the refillable cartridge; and an outlet configured to spray the fluid in a spray pattern.

Example 14 is the fluid sprayer system of any or all previous examples further comprising:

a handle configured to removably couple to the plunger, wherein, when the handle is coupled to the plunger, at least a portion of the handle is disposed outside of the housing of the refillable cartridge.

Example 15 is the fluid sprayer system of any or all previous examples wherein the refillable cartridge comprises a valve through which the fluid is drawn into the housing and the fluid is expelled out of the housing.

Example 16 is the fluid sprayer system of any or all previous examples further comprising a pickup assembly configured to couple to the valve of the refillable cartridge, the pickup assembly defining a fluid path that the fluid follows as it is drawn into the housing of the refillable cartridge.

Example 17 is the fluid sprayer system of any or all previous examples further comprising an outlet offset device configured to couple to the valve and offset an inlet of the cartridge.

Example 18 is the fluid sprayer system of any or all previous examples wherein the refillable cartridge comprises a pressure inlet configured to receive a pressurized fluid that generates a biasing force on the plunger in the second direction.

Example 19 is the fluid sprayer system of any or all previous examples wherein the refillable cartridge is removably couplable to the inlet and interchangeable with a second refillable cartridge.

Example 20 is a fluid sprayer system comprising:

a fluid reservoir that stores a first fluid;

a reciprocating mechanism that is driven by a motor;

a first fluid pump driven by the reciprocating mechanism and configured to pump the first fluid from the fluid reservoir; and a second fluid pump driven by the reciprocating mechanism and configured to pressurize a second fluid to assist in delivery of the first fluid from the reservoir to the first pump.

Example 21 is the fluid sprayer system of any or all previous examples wherein the first fluid pump actuates between a driving state where the first fluid is pumped towards an outlet of the fluid sprayer system and a retracting state where the first fluid is drawn from a first fluid source.

Example 22 is the fluid sprayer system of any or all previous examples further comprising an accumulator that stores energy when the first fluid pump is in the driving state and releases energy when the first fluid pump is in the retracting state.

Example 23 is the fluid sprayer system of any or all previous examples wherein the accumulator comprises:

a fluid chamber configured to receive the first fluid;

a pressurized chamber that contains a pressurized fluid; and a pliable wall that separates the fluid chamber from the pressurized chamber.

Example 24 is the fluid sprayer system of any or all previous examples wherein the second fluid pump comprises:

a housing;

a piston disposed in the housing and configured to actuate in a driving direction and a retracting direction, the piston having a discontinuous component; and a seal configured to create a seal between the housing and the piston when the piston is actuating in the driving direction, such that the second fluid is forced in the driving direction and the seal contacts the discontinuous component when the piston is actuating in the retracting direction such that the second fluid can flow about the seal.

Example 25 is the fluid sprayer system of any or all previous examples wherein the reciprocating mechanism comprises a scotch yoke. Although the present invention has been described with reference to preferred examples, workers skilled in the art will recognize that changes may be made in form and detail without departing from the spirit and scope of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A portable fluid spraying system comprising:

a handheld fluid sprayer comprising:

a fluid reservoir configured to store a fluid;

a pump configured to pump the fluid from the fluid reservoir to an outlet of the handheld fluid sprayer;

a handle; and a first trigger proximate the handle, the first trigger configured to actuate a valve of the handheld fluid sprayer that controls fluid flow to the outlet;

a fluid hose having a coupling mechanism configured to removably couple to the handheld fluid sprayer proximate the outlet, wherein the coupling mechanism comprises a pin configured to mechanically actuate the valve of the handheld fluid sprayer when the fluid hose is coupled to the handheld fluid sprayer; and a fluid spray gun comprising:

a gun inlet configured to couple to the fluid hose and receive the fluid from the handheld fluid sprayer;

a gun outlet configured to expel the fluid in a spray pattern; and a second trigger configured to control fluid flow to the gun outlet.

2. The portable fluid spraying system of claim 1, wherein the handheld fluid sprayer comprises a carrying strap.

3. The portable fluid spraying system of claim 2, wherein the handheld fluid sprayer comprises:

a battery; and a motor powered by the battery and configured to drive the pump.

4. The portable fluid spraying system of claim 1, wherein:

the coupling mechanism comprises at least a first thread, and the handheld fluid sprayer comprises at least a second thread that corresponds to the first thread.

5. The portable fluid spraying system of claim 1, wherein the fluid reservoir is removably couplable to the handheld fluid sprayer and interchangeable with a second fluid reservoir.

6. The portable fluid spraying system of claim 1, wherein the fluid spray gun is configured to be hand held by a user and the handheld fluid sprayer is configured to be carried by the user.

7. The portable fluid spraying system of claim 1, wherein the handheld fluid sprayer includes an accumulator.

8. A portable fluid sprayer system comprising:

a fluid reservoir configured to store a fluid;

a fluid sprayer having an outlet coupling mechanism, wherein the fluid sprayer comprises;

a battery; and a first pump driven by a motor that is powered by the battery, the first pump configured to pump the fluid from the fluid reservoir to a sprayer outlet proximate the outlet coupling mechanism; and a second pump that is driven by the motor, the second pump configured to pressurize the fluid reservoir; outlet assembly comprising:

a spray tip and a first coupling mechanism configured to removably couple to the outlet coupling mechanism;

a fluid nose having a second coupling mechanism configured to removably couple to the outlet coupling mechanism; and a fluid applicator configured to couple to the fluid hose and receive the fluid from the fluid sprayer.

9. The portable fluid sprayer system of claim 8, wherein the second coupling mechanism comprises a pin that opens a valve of the fluid sprayer when the second coupling mechanism is coupled to the outlet coupling mechanism.

10. The portable fluid sprayer system of claim 8, wherein the outlet coupling mechanism comprises at least a first thread, the first coupling mechanism comprises at least a second thread that correspond to the first thread, and the second coupling mechanism comprises at least a third thread that correspond to the first thread.

11. The portable fluid sprayer system of claim 8, wherein the fluid reservoir is removably couplable to the fluid sprayer and interchangeable with a second fluid reservoir.

12. The portable fluid sprayer system of claim 8, wherein the fluid sprayer comprises a carrying strap.

13. The portable fluid sprayer system of claim 8, wherein the fluid sprayer includes an accumulator.

* * * * *